United States Patent
McVey et al.

(10) Patent No.: US 9,951,174 B2
(45) Date of Patent: Apr. 24, 2018

(54) POLYOL COMPOSITIONS, A PROCESS FOR THE PRODUCTION OF THESE POLYOL COMPOSITIONS, AND THEIR USE IN THE PRODUCTION OF OPEN CELLED POLYURETHANE FOAMS HAVING HIGH AIRFLOW

(71) Applicant: Covestro LLC, Pittsburgh, PA (US)

(72) Inventors: Susan B. McVey, Houston, PA (US); Stanley L. Hager, Little River, SC (US); Micah N. Moore, Red House, WV (US); Jack R. Reese, Coraopolis, PA (US)

(73) Assignee: Covestro LLC, Pittsburgh, PA (US)

( * ) Notice: Subject to any disclaimer, the term of this patent is extended or adjusted under 35 U.S.C. 154(b) by 29 days.

(21) Appl. No.: 15/160,533

(22) Filed: May 20, 2016

(65) Prior Publication Data
US 2016/0340464 A1    Nov. 24, 2016

Related U.S. Application Data

(60) Provisional application No. 62/164,297, filed on May 20, 2015.

(51) Int. Cl.
| | |
|---|---|
| *C08G 18/78* | (2006.01) |
| *C08G 18/66* | (2006.01) |
| *C08G 18/63* | (2006.01) |
| *C08G 18/48* | (2006.01) |
| *C08G 18/16* | (2006.01) |
| *C08G 18/76* | (2006.01) |
| C08G 101/00 | (2006.01) |

(52) U.S. Cl.
CPC ....... *C08G 18/7621* (2013.01); *C08G 18/165* (2013.01); *C08G 18/4816* (2013.01); *C08G 18/4837* (2013.01); *C08G 18/4841* (2013.01); *C08G 18/632* (2013.01); *C08G 18/667* (2013.01); *C08G 18/7664* (2013.01); *C08G 18/4804* (2013.01); *C08G 2101/0016* (2013.01); *C08G 2101/0083* (2013.01)

(58) Field of Classification Search
CPC ................................................ C08G 18/4804
See application file for complete search history.

(56) References Cited

U.S. PATENT DOCUMENTS

| | | |
|---|---|---|
| 3,304,273 A | 2/1967 | Stamberger |
| 3,383,351 A | 5/1968 | Stamberger |
| 3,404,109 A | 10/1968 | Milgrom et al. |
| 3,405,077 A | 10/1968 | Pastor et al. |
| 3,427,334 A | 2/1969 | Belner |
| 3,433,752 A | 3/1969 | Zagoren et al. |
| 3,454,504 A | 7/1969 | Murai et al. |
| 3,523,093 A | 8/1970 | Stamberger |
| 3,538,043 A | 11/1970 | Herold |
| 3,652,639 A | 3/1972 | Pizzini et al. |
| 3,823,201 A | 7/1974 | Pizzini et al. |
| 3,875,086 A | 4/1975 | Ramey et al. |
| 3,900,518 A | 8/1975 | Milgrom |
| RE28,715 E | 2/1976 | Stamberger |
| 3,941,849 A | 3/1976 | Herold |
| RE29,118 E | 1/1977 | Stamberger |
| 4,089,835 A | 5/1978 | Konig et al. |
| 4,104,236 A | 8/1978 | Simroth |
| 4,111,865 A | 9/1978 | Seefried, Jr. et al. |
| 4,119,586 A | 10/1978 | Shah |
| 4,125,505 A | 11/1978 | Critchfield et al. |
| 4,148,840 A | 4/1979 | Shah |
| 4,172,825 A | 10/1979 | Shook et al. |
| 4,209,593 A | 6/1980 | Khanna |
| 4,260,530 A | 4/1981 | Reischl et al. |
| 4,324,715 A | 4/1982 | Emerick |
| 4,374,209 A | 2/1983 | Rowlands |
| 4,438,001 A | 3/1984 | Suzuki et al. |
| 4,472,560 A | 9/1984 | Kuyper et al. |
| 4,477,589 A | 10/1984 | Van Der Hulst et al. |
| 4,524,157 A | 6/1985 | Stamberger |
| 4,656,196 A | 4/1987 | Kelly et al. |
| 4,670,477 A | 6/1987 | Kelly et al. |
| 4,690,956 A | 9/1987 | Ramlow et al. |
| 4,950,694 A | 8/1990 | Hager |
| 4,950,695 A | 8/1990 | Stone |
| 4,950,965 A | 8/1990 | Kenny et al. |
| 4,981,880 A | 1/1991 | Lehmann et al. |
| 5,011,908 A | 4/1991 | Hager |
| 5,114,619 A | 5/1992 | Heuvelsland |
| 5,145,883 A | 9/1992 | Saito et al. |
| 5,152,922 A | 10/1992 | Meyer et al. |
| 5,158,922 A | 10/1992 | Hinney et al. |
| 5,292,778 A | 3/1994 | Van Veen et al. |
| 5,321,077 A | 6/1994 | Hayes et al. |
| 5,324,774 A | 6/1994 | Nishikawa et al. |
| 5,358,984 A | 10/1994 | Hayes et al. |
| 5,364,906 A | 11/1994 | Critchfield et al. |
| 5,453,469 A | 9/1995 | Yezrielev et al. |
| 5,470,813 A | 11/1995 | Le Khac |
| 5,482,908 A | 1/1996 | Le Khac |
| 5,488,085 A | 1/1996 | Hayes et al. |
| 5,496,894 A | 3/1996 | Critchfield et al. |
| 5,539,011 A | 7/1996 | Hilker et al. |
| 5,554,662 A | 9/1996 | Sanders et al. |
| 5,594,066 A | 1/1997 | Heinemann et al. |

(Continued)

FOREIGN PATENT DOCUMENTS

JP    2000290344 A    10/2000

*Primary Examiner* — Melissa A Rioja
(74) *Attorney, Agent, or Firm* — N. Denise Brown

(57) ABSTRACT

This invention relates to a novel polyol composition and a process for preparing these polyol compositions. These novel polyol compositions comprise (a) an in-situ formed polyol blend which comprises (i) one or more polyether monols and (ii) one or more polyether polyols; and (b) a polyether polyol. This invention also relates to a process for preparing an open celled, flexible polyurethane foam in which the isocyanate-reactive component comprises this novel polyol composition, and to a viscoelastic polyurethane foam wherein the isocyanate-reactive comprise the novel polyol composition.

5 Claims, 3 Drawing Sheets

(56) References Cited

U.S. PATENT DOCUMENTS

| | | |
|---|---|---|
| 5,631,319 A | 5/1997 | Reese et al. |
| 5,670,601 A | 9/1997 | Allen et al. |
| 5,689,012 A | 11/1997 | Pazos et al. |
| 5,777,177 A | 7/1998 | Pazos |
| 5,814,699 A | 9/1998 | Kratz et al. |
| 5,824,712 A | 10/1998 | Willkomm et al. |
| 5,916,994 A | 6/1999 | Izukawa et al. |
| 5,919,988 A | 7/1999 | Pazos et al. |
| 5,990,185 A | 11/1999 | Fogg |
| 5,995,534 A | 11/1999 | Fullerton et al. |
| 6,034,145 A | 3/2000 | Cornet et al. |
| 6,034,197 A | 3/2000 | Mahon et al. |
| 6,063,309 A | 5/2000 | Hager et al. |
| 6,066,683 A | 5/2000 | Beisner et al. |
| 6,117,937 A | 9/2000 | Matsumoto et al. |
| 6,136,879 A | 10/2000 | Nishida et al. |
| 6,218,444 B1 | 4/2001 | Hager et al. |
| 6,391,395 B1 | 5/2002 | Tseng et al. |
| 6,391,820 B1 | 5/2002 | Ooms et al. |
| 6,391,933 B1 | 5/2002 | Mattesky |
| 6,391,935 B1 | 5/2002 | Hager et al. |
| 6,455,603 B1 | 9/2002 | Fogg |
| 6,472,447 B1 | 10/2002 | Lorenz et al. |
| 6,491,846 B1 | 12/2002 | Reese, II et al. |
| 6,521,674 B1 | 2/2003 | Haley et al. |
| 6,624,209 B2 | 9/2003 | Kawamoto et al. |
| 6,638,986 B2 | 10/2003 | Falke et al. |
| 6,713,599 B1 | 3/2004 | Hinz et al. |
| 6,756,414 B2 | 6/2004 | Kawamoto et al. |
| 6,762,214 B1 | 7/2004 | Tracy et al. |
| 6,838,516 B2 | 1/2005 | Dai et al. |
| 7,051,389 B2 | 5/2006 | Wassilefky |
| 7,078,443 B2 | 7/2006 | Milliren |
| 7,179,882 B2 | 2/2007 | Adkins et al. |
| 7,415,742 B2 | 8/2008 | Wassilefsky |
| 7,469,437 B2 | 12/2008 | Mikkelsen et al. |
| 7,530,127 B2 | 5/2009 | Leifermann et al. |
| 7,735,169 B2 | 6/2010 | Wassilefsky |
| 7,754,809 B2 | 7/2010 | Stollmaier et al. |
| 7,759,423 B2 | 7/2010 | Chauk |
| 7,968,754 B2 | 6/2011 | Ostrowski et al. |
| 8,242,184 B2 | 8/2012 | Sasaki et al. |
| 8,268,906 B2 | 9/2012 | Sasaki et al. |
| 8,418,297 B2 | 4/2013 | Mikkelsen et al. |
| 8,487,015 B2 | 7/2013 | Sasaki et al. |
| 8,541,479 B2 | 9/2013 | Sasaki et al. |
| 8,656,537 B2 | 2/2014 | Leifermann et al. |
| 8,975,306 B2 | 3/2015 | Milliren |
| 8,975,335 B2 | 3/2015 | Hager et al. |
| 9,029,432 B2 | 5/2015 | Aou et al. |
| 9,133,298 B2 | 9/2015 | Hager et al. |
| 9,255,174 B2 | 2/2016 | Aou et al. |
| 9,266,996 B2 | 2/2016 | Obi et al. |
| 2004/0019160 A1 | 1/2004 | Dai et al. |
| 2007/0072951 A1* | 3/2007 | Bender .............. C08G 18/4072 521/122 |
| 2007/0299153 A1 | 12/2007 | Hager et al. |
| 2008/0139685 A1 | 6/2008 | Reese et al. |
| 2009/0062416 A1 | 3/2009 | Sasaki et al. |
| 2009/0215918 A1 | 8/2009 | Sasaki et al. |
| 2010/0168262 A1 | 7/2010 | Sasaki et al. |
| 2012/0202908 A1 | 8/2012 | Sasaki et al. |
| 2012/0238656 A1* | 9/2012 | De Kesel .............. C08J 9/0061 521/137 |
| 2013/0079429 A1* | 3/2013 | Hager .................... C08L 75/08 521/123 |
| 2013/0289150 A1 | 10/2013 | Hager et al. |
| 2015/0077640 A1 | 3/2015 | Kanda |
| 2016/0340464 A1 | 11/2016 | McVey et al. |

\* cited by examiner

POLYOL COMPOSITIONS, A PROCESS FOR THE PRODUCTION OF THESE POLYOL COMPOSITIONS, AND THEIR USE IN THE PRODUCTION OF OPEN CELLED POLYURETHANE FOAMS HAVING HIGH AIRFLOW

BACKGROUND OF THE INVENTION

The invention relates to a novel polyol composition and a process for preparing these polyol compositions. These novel polyol compositions comprise (a) an in-situ formed polyol blend which comprises (i) one or more polyether monols and (ii) one or more polyether polyols; and (b) a polyether polyol. The process of preparing these novel polyol compositions comprises forming: an in-situ formed polyol blend of one or more polyether monols, and one or more polyether polyols, by polymerizing an epoxide in the presence of a double metal cyanide (DMC) catalyst, an initially charged monofunctional starter ($S_i$), and a continuously added polyfunctional starter ($S_c$); and blending the in-situ formed polyol blend, with at least one polyether polyol. This invention also relates to a process for preparing an open celled, flexible polyurethane foam having high airflows in which the isocyanate-reactive component comprises this novel polyol composition. It also relates to open celled flexible polyurethane foams wherein the isocyanate-reactive component comprise the novel polyol composition.

SUMMARY OF THE INVENTION

The novel polyol compositions of the invention comprise:
(a) from 20 to 98% by weight, based on 100% by weight of components (a) and (b), of an in-situ formed polyol blend having a hydroxyl number of from about 56 to about 250, an average functionality of greater than about 2, and which comprises:
  (i) from 25 to 75% by weight, based on 100% by weight of (i) and (ii), of one or more polyether monols having a hydroxyl number of less than 56, and containing less than 20% by weight of copolymerized oxyethylene, based on 100% by weight of (a)(i),
  and
  (ii) from 25 to 75% by weight, based on 100% by weight of (i) and (ii), of one or more polyether polyols having a hydroxyl number of about 47 to about 300, an average functionality of greater than 2 to about 6, and containing from about 5 to about 45% by weight of copolymerized oxyethylene, based on 100% by weight of (a)(ii);
and
(b) from 2 to 80% by weight, based on 100% by weight of components (a) and (b), of one or more polyether polyols having a functionality of 2 to 8, a hydroxyl number of 20 to 240 and comprising at least 50% by weight of copolymerized oxyethylene, based on 100% by weight of (b).

In accordance with the invention, the novel polyol blends may additionally comprise at least one of: (c) one or more polyether polyols, which are different from (a)(ii), having an OH number of from about 10 to about 300, a functionality of from about 2 to about 8, and which contain from 0 to 45% by weight of copolymerized oxyethylene, based on 100% by weight of component (c); and/or (d) one or more filled polyols which are also commonly referred to as polymer polyols. The amount of components (c) and/or (d) that may be present in the novel polyol blends herein ranges from 0 to 50% by weight, based on 100% by weight of components (a), (b), (c) and (d).

A process for the preparation of these novel polyol compositions comprises:
(I) the in-situ production of a polyol blend, comprising:
  A) introducing into a reaction vessel a mixture comprising:
    (1) an initial starter ($S_i$) comprising one or more monofunctional compounds having a hydroxyl number of less than about 56 and containing less than 20% by weight of copolymerized oxyethylene, based on 100% by weight of the monofunctional compounds, and
    (2) a DMC (double metal cyanide) catalyst,
  B) feeding
    (1) an epoxide comprising propylene oxide and ethylene oxide in a weight ratio of from 100:0 to 20:80, into the reaction vessel;
  C) allowing the epoxide mixture and the initial starter ($S_i$) to react and continue to polymerize by feeding the epoxide until the equivalent weight of the monofunctional compound is increased by at least 10% by weight and reaches a value between about 1,500 and about 6,000;
  D) continuously adding
    (1) one or more low molecular weight starters ($S_c$) having a functionality of greater than 2 to about 6 and an equivalent weight of about 28 to about 400 into the reaction vessel while continuing to feed epoxide;
  E) completing addition of the continuous starter ($S_c$); and
  F) allowing the mixture to continue to polymerize in the reaction vessel until the resultant polyol blend has an overall hydroxyl number of from about 56 to about 250, an average functionality of greater than 2, and comprises
    (1) from about 25 to 75% by weight, based on 100% by weight of F)(1) and F)(2), of one or more polyether monols having a hydroxyl number of less than 56, and containing less than 20% by weight of copolymerized oxyethylene, based on 100% by weight of F)(1);
    and
    (2) from about 25 to 75% by weight, based on 100% by weight of F)(1) and F)(2), of one or more polyether polyols having a hydroxyl number of about 47 to about 300, an average functionality of greater than 2 to about 6, and containing from about 5 to about 45% by weight of copolymerized oxyethylene, based on 100% by weight of F)(2);
and
(II) blending or mixing the resultant in-situ produced polyol blend, with
  A) at least one polyether polyol having a functionality of 2 to 8, a hydroxyl number of 20 to 240 and comprising at least 50% of copolymerized oxyethylene, based on 100% by weight of the polyether polyol A).

In accordance with the invention, the process of preparing these novel polyol blends may additionally comprise (II) blending or mixing the resultant in-situ produced polyol blend from (I) with at least one of: B) one or more polyether polyols, which are different from (a)(ii), having an OH number of from about 10 to about 300, a functionality of from about 2 to about 8, and which contain from 0 to 45% by weight of copolymerized oxyethylene, based on 100% by weight of component B); and/or C) one or more filled polyols which are also commonly referred to as polymer polyols.

This invention also relates to a process of preparing an open celled, flexible polyurethane foam in which the isocyanate-reactive component comprises this novel polyol composition. This process comprises reacting an isocyanate-functional component with an isocyanate-reactive component in the presence of components comprising a blowing agent, a catalyst, and a surfactant, and wherein the isocyanate-functional component and the isocyanate-reactive component are reacted at an isocyanate index of 85 to 120. The suitable isocyanate-reactive components comprise: (a) from 20 to 98% by weight, based on 100% by weight of components (a) and (b), of an in-situ formed polyol blend having a hydroxyl number of from about 56 to about 250, an average functionality of greater than 2, and which comprises: (i) from 25 to 75% by weight, based on 100% by weight of (i) and (ii), of one or more polyether monols having a hydroxyl number of less than 56, and containing less than 20% by weight of copolymerized oxyethylene, based on 100% by weight of (a)(i), and (ii) from 25 to 75% by weight, based on 100% by weight of (i) and (ii), of one or more polyether polyols having a hydroxyl number of about 47 to about 300, an average functionality of greater than 2 to about 6, and containing from about 5 to about 45% by weight of copolymerized oxyethylene, based on 100% by weight of (a)(ii); and (b) from 2 to 80% by weight, based on 100% by weight of components (a) and (b), of one or more polyether polyols having a functionality of 2 to 8, a hydroxyl number of 20 to 240 and comprising at least 50% of copolymerized oxyethylene, based on 100% by weight of the polyether polyol (b).

In the process of preparing an open celled, flexible polyurethane foam, the isocyanate-reactive component may additionally comprise at least one of: (c) one or more polyether polyols, which are different from (a)(ii), having an OH number of from about 10 to about 300, a functionality of from about 2 to about 8, and which contain from 0 to 45% by weight of copolymerized oxyethylene, based on 100% by weight of component (c); and/or (d) one or more filled polyols which are also commonly referred to as polymer polyols.

Open celled flexible polyurethane foams of the invention comprise a reaction product of an isocyanate-functional component with an isocyanate-reactive component at an isocyanate index of 85 to 120 and in the presence of a blowing agent, a catalyst, and a surfactant. Suitable isocyanate-reactive components for these foams comprise: (a) from 20 to 98% by weight, based on 100% by weight of components (a) and (b), of an in-situ formed polyol blend having a hydroxyl number of from about 56 to about 250, an average functionality greater than about 2, and which comprises: (i) from 25 to 75% by weight, based on 100% by weight of (i) and (ii), of one or more polyether monols having a hydroxyl number of less than 56 and containing less than 20% by weight of copolymerized oxyethylene, based on 100% by weight of (a)(i), and (ii) from 25 to 75% by weight, based on 100% by weight of (i) and (ii), of one or more polyether polyols having a hydroxyl number of about 47 to about 300, an average functionality of greater than about 2 to about 6, and containing from about 5 to about 45% by weight of copolymerized oxyethylene, based on 100% by weight of (a)(ii); and (b) from 2 to 80% by weight, based on 100% by weight of components (a) and (b), of one or more polyether polyols having a functionality of 2 to 8, a hydroxyl number of 20 to 240 and comprising at least 50% of copolymerized oxyethylene, based on 100% by weight of the polyether polyol (b).

In the open celled flexible polyurethane foams, the isocyanate-reactive component may additionally comprise at least one of: (c) one or more polyether polyols, which are different than (a)(ii), having an OH number of from about 10 to about 300, a functionality of from about 2 to about 8, and which contain from 0 to 45% by weight of copolymerized oxyethylene, based on 100% by weight of component (c); and/or (d) one or more filled polyols which are also commonly referred to as polymer polyols.

Another feature of the present invention involves the use of foam processing aids or foam modifiers that enhance processing and help stabilize the foam against cold flow or dishing.

DETAILED DESCRIPTION OF THE INVENTION

Figure 1A:
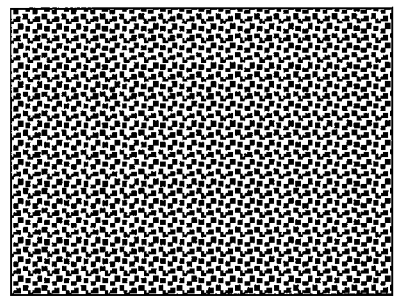
FIG. 1A is a cross-sectional view of a standard foam block which is representative of one embodiment of the present invention.

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Equivalent weights and molecular weights given herein in Daltons (Da) are number average equivalent weights and number average molecular weights respectively, unless indicated otherwise.

Isocyanate index is the relative stoichiometric amount of isocyanate functional groups necessary to react with the isocyanate reactive groups present in the overall foam formulation. It is expressed as a percentage in this application; thus equal stoichiometric amounts of isocyanate functional groups and isocyanate reactive functional groups in the formulation provide an isocyanate index of 100%.

Figure 1B:
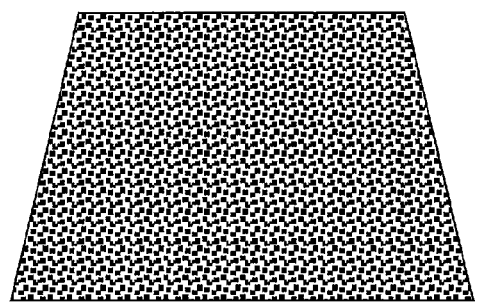
FIG. 1B is a cross-sectional view of a foam block which illustrates cold flow.

As used herein, the definition of cold flow is the distortion, deformation or dimensional change which takes place in materials under continuous load at ambient temperature (source: CRC Press LLC, 1989). By "continuous load" it is meant the slabstock foam's own weight. A foam block which exhibits cold flow is shown in FIG. 1B. Such foams have a trapezoidal shape.

Figure 1C:
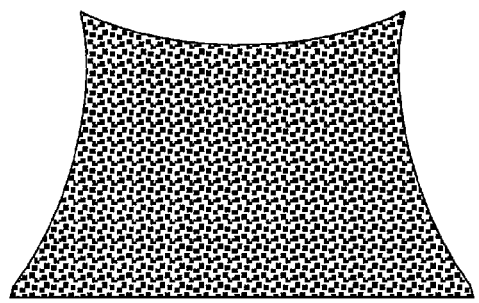
FIG. 1C is a cross-sectional view of a foam block which illustrates dishing.

As used herein, the term dishing is used to refer to the distortion, deformation or dimensional change which takes place in materials under continuous load at ambient temperature similarly to cold flow but dishing specifically refers to foams or materials in which the sides and top of the foam block pucker as shown in FIG. 1C.

As used herein, the term nominal equivalent weight refers to the expected molar weight per reactive hydroxyl group assuming the epoxide adds exclusively to the low equivalent weight polyol component, once the continuous polyol starter ($S_c$) feed is begun. The nominal molecular weight is the nominal number average equivalent weight multiplied by the starter functionality. The nominal hydroxyl number equals 56,100 divided by the nominal equivalent weight.

The novel polyol compositions of the invention comprise:

(a) from 20 to 98% by weight, based on 100% by weight of components (a) and (b), of an in-situ formed polyol blend having a hydroxyl number of from about 56 to about 250, an average functionality greater than about 2, and comprising:
  (i) from 25 to 75% by weight, based on 100% by weight of (i) and (ii), of one or more polyether monols having a hydroxyl number of less than 56, and containing less than 20% by weight of copolymerized oxyethylene, based on 100% by weight of (a)(i),
  and
  (ii) from 25 to 75% by weight, based on 100% by weight of (i) and (ii), of one or more polyether polyols having a hydroxyl number of about 47 to about 300, an average functionality of greater than 2 to about 6, and containing from about 5 to about 45% by weight of copolymerized oxyethylene, based on 100% by weight of (a)(ii);

and (b) from 2 to 80% by weight, based on 100% by weight of components (a) and (b), of one or more polyether polyols having a functionality of 2 to 8, a hydroxyl number of 20 to 240 and comprising at least 50% of copolymerized oxyethylene, based on 100% by weight of the polyether polyol (b).

Suitable polyether monols for component (a)(i) include those monols having a hydroxyl number of less than 56, or of less than 28.

Suitable starters for (a)(i) include polyoxyalkylene monols formed by addition of multiple equivalents of epoxide to low molecular weight monofunctional starters such as, for example, methanol, ethanol, phenols, allyl alcohol, longer chain alcohols, etc., and mixtures thereof. Examples of suitable longer chain alcohols include $C_{12}$, $C_{13}$, $C_{14}$ and/or $C_{15}$ monols, which may be used individually or as mixtures. Suitable epoxides can include, for example, ethylene oxide, propylene oxide, butylene oxide, styrene oxide, etc. and mixtures thereof. The epoxides can be polymerized using well-known techniques and a variety of catalysts, including alkali metals, alkali metal hydroxides and alkoxides, double metal cyanide complexes, and many more. Suitable monofunctional starters can also be made, for example, by first producing a diol or triol and then converting all but one of the remaining hydroxyl groups to an ether, ester or other non-reactive group. Suitable monofunctional starters include those monols described in, for example, U.S. Pat. Nos. 6,391,935 and 6,821,308, the disclosures of which are hereby incorporated by reference.

In one embodiment, the polyoxyalkylene monol starter comprises a polyoxypropylene monol having a hydroxyl number of less than 56. These compounds facilitate DMC catalyzed addition of epoxide and provide good build ratios for the production of the in-situ formed polyol blends (a).

The polyether monols may also be characterized in one embodiment as containing up to about 20% by weight of copolymerized oxyethylene, based on 100% by weight of the monofunctional polyether. This weight percentage includes the initiator or starter and all of the added epoxide(s). These polyether monols may contain less than or equal to about 20% by weight, or less than or equal to about 15% by weight, or less than or equal to about 10% by weight, based on 100% by weight of the polyether monol, of copolymerized oxyethylene. These polyether monols may also contain more than 0%, or at least about 2% or at least about 5%, based on 100% by weight of the monofunctional polyether, of copolymerized oxyethylene. The amount of copolymerized oxyethylene present in the polyether monols may vary between any combination of these upper and lower values, inclusive, such as, of more than 0% to less than or equal to about 20%, or at least about 2% to less than or equal to about 15%, or at least about 5% to less than or equal to about 10% by weight.

The polyether monols can have virtually any desired arrangement of oxyalkylene units with the proviso that these contain less than 20% of copolymerized oxyethylene, based on 100% by weight of the polyether monol. This weight percentage includes the initiator or starter and all of the added epoxide(s). In general, all of the oxyethylene units are not concentrated at the end of the polyoxyalkylene monols such that the primary hydroxyl group content of the monol is less than 23% by weight. Some examples of suitable polyether monols include PO homopolymers, block EO-PO copolymers, random EO/PO copolymers, PO polymers that are "tipped" with DO or with a mixture of DO and PO are possible but not preferred. These "tipped" PO polymers should use a mixture of EO and PO to achieve a particular oxyethylene content and/or a desired primary hydroxyl content (less than 23%), or any other desired configuration. The so-called PO homopolymers are suitable with the proviso that they satisfy the above described amounts of copolymerized oxyethylene.

Suitable polyether polyols for component (a)(ii) typically have a hydroxyl number of from about 47 to about 300, an average functionality of greater than 2 to about 6. These polyether polyols may also have hydroxyl numbers of from at least about 47, or from at least about 70. The polyether polyols may also have hydroxyl numbers of less than or equal to 300, or of less than or equal to 240. Suitable polyether polyols may also have a hydroxyl number ranging between any combination of these upper and lower values, inclusive, of from at least about 47 to about 300, or from at least about 70 to about 240. The polyether polyols may also have an average functionality of greater than 2.0, or of at least about 2.5. The average functionality of the polyether polyols may also be less than or equal to about 6, or less than or equal to about 3.5. Suitable polyether polyols may have an average functionality ranging between any combination of these upper and lower values, inclusive, such as from greater than 2 to about 6, or from at least about 2.5 to about 3.5. These polyether polyols (ii) may be prepared from low molecular weight starters such as, for example, glycerin, propylene glycol, dipropylene glycol, ethylene glycol, trimethylolpropane, sucrose, sorbitol, tripropylene glycol, and the like, and mixtures thereof.

In one embodiment, component (a)(ii) comprises a combination of at least one polyether polyol having an average functionality of 2 and of at least one polyether polyol having an average functionality of about 3.

Suitable polyether polyols for component (a)(ii) contain from about 5 to about 45% by weight of copolymerized oxyethylene. These polyether polyols may contain at least about 5%, or at least about 10%, or at least about 15%, of copolymerized oxyethylene, based on 100% by weight of the polyether polyol (a)(ii). These polyether polyols may contain about 45% or less, or about 40% or less, or about 35% or less of copolymerized oxyethylene, based on 100% by weight of the polyether polyol (a)(ii). These weight percents include the starter or initiator, and the all of the added epoxide(s). Suitable polyether polyols herein may contain any amount of copolymerized oxyethylene between the above disclosed upper and lower values, inclusive, unless otherwise stated, such as at least about 5% to about 45% or less, or at least about 10% to about 40% or less, or at least about 15% to about 35% by weight or less.

These polyether polyols (a)(ii) can be block EO-PO copolymers, EO-capped polyoxypropylenes, random EO/PO copolymers, PO polymers that are "tipped" with a mixture of EO and PO to achieve the desired amount of copolymerized oxyethylene and/or a particular primary hydroxyl content, or any other desired configuration.

Suitable polyether polyols for component (b) include those polyols which have a functionality of at least about 2 to about 8 or less, a hydroxyl number of at least about 20 to about 240 or less, and contain at least 50% of copolymerized oxyethylene, based on 100% by weight of the polyether polyol (b). As previously stated, these polyether polyols are different than the polyether polyols (a)(ii). Suitable polyether polyols for component (b) may commonly be referred to as cell opening polyols.

These polyether polyols for component (b) may have hydroxyl numbers of from at least about 20 mg KOH/g, or at least about 30 mg KOH/g, or at least about 35 mg KOH/g. In addition, the polyether polyols generally have hydroxyl numbers of about 240 mg KOH/g or less, or about 170 mg KOH/g or less, or about 50 mg KOH/g or less. The suitable polyether polyols of the present invention may be characterized by a hydroxyl number between any of the above values, inclusive, unless otherwise stated, such as, from at least about 20 to about 240 mg KOH/g or less, or at least about 30 to about 170 mg KOH/g or less, or at least about 35 mg KOH/g to about 50 mg KOH/g or less.

The average functionality of these polyether polyols (b) ranges from at least about 2, or from at least about 2.5. The average functionality is also typically about 8 or less, or about 6 or less. The average functionality of the polyether polyols (b) may range between any combination of these upper and lower values, inclusive, such as from at least about 2 to about 8 or less, or from at least about 2.5 to about 6 or less.

Suitable polyether polyols used as component (b) also contain at least 50% to about 99% by weight or less of copolymerized oxyethylene, based on 100% by weight of the polyether polyol. This weight percent includes the starter or initiator, and the all of the added epoxide(s). These polyether polyols may contain at least about 50%, or at least about 60% or at least about 70% by weight, of copolymerized oxyethylene, based on 100% by weight of the polyether polyol. These polyether polyols may also contain about 99% or less, or about 90% or less, or about 85% or less of copolymerized oxyethylene, based on 100% by weight of the polyether polyol. Suitable polyether polyols herein may contain any amount of copolymerized oxyethylene between the above disclosed values, inclusive, such as from at least about 50% to about 99% or less, or from at least about 60% to about 90% or less, or from at least about 70% to about 85% by weight or less, of copolymerized oxyethylene.

Some examples of suitable polyether polyols for component (b) include those compounds which are conveniently made by reacting compounds having two or more active hydrogens (e.g., glycols, triols, tetrols, hexols, polyfunctional amines and other polyfunctional starters known to those in the art) with one or more equivalents of an epoxide as described earlier. Examples of suitable starters for these polyether polyols (b) include low molecular weight starters such as, for example, glycerin, propylene glycol, dipropylene glycol, ethylene glycol, trimethylolpropane, sucrose, sorbitol, tripropylene glycol, and the like, and mixtures thereof.

Suitable epoxides for component (b) can include, for example, ethylene oxide, propylene oxide, butylene oxide, styrene oxide, etc. and mixtures thereof. The epoxides can be polymerized using well-known techniques and a variety of catalysts, including alkali metals, alkali metal hydroxides and alkoxides, double metal cyanide complexes and many more.

These polyether polyols can have any desired arrangement of oxyalkylene units with the proviso that they contain at least 50% of copolymerized oxyethylene, based on the 100% by weight of the polyether polyol. Thus, the polyether polyols (b) can be EO homopolymers, block EO-PO copolymers, EO-capped polyoxypropylenes, PO capped polyoxyethylenes, random EO/PO copolymers, PO polymers that are "tipped" with a mixture of DO and PO to achieve the desired amount of copolymerized oxyethylene and/or a particular primary hydroxyl content, or any other desired configuration.

As previously stated, the novel polyol blends herein may additionally comprise components (c) and/or (d). Components (c) and/or (d) may be present in amounts of from 0 to about 50% by weight, or from about 1 to about 40% by weight, based on 100% by weight of components (a), (b), (c) and (d).

In one embodiment, these novel polyol blends may additionally comprise (c) one or more polyether polyols having an OH number of from about 10 to about 300, a functionality of from about 2 to about 8, and contain from 0 to 45% by weight of copolymerized oxyethylene, based on 100% by weight of component (c).

Suitable compounds to be used as polyether polyols (c) include those polyols which have a functionality of at least about 2 to about 8 or less, a hydroxyl number of at least about 10 to about 300 or less, and contain from 0% to about 45% by weight of copolymerized oxyethylene, based on 100% by weight of the polyether polyol (c). These polyether polyols are different than the polyether polyols (a)(ii).

These polyether polyols for component (c) may have hydroxyl numbers of from at least about 10 mg KOH/g, or at least about 20 mg KOH/g, or at least about 25 mg KOH/g. In addition, the polyether polyols generally have hydroxyl numbers of about 300 mg KOH/g or less, or about 150 mg KOH/g or less, or about 75 mg KOH/g or less. The suitable polyether polyols of the present invention may be characterized by a hydroxyl number between any of the above values, inclusive, unless otherwise stated, such as, from at least about 10 to about 300 mg KOH/g or less, or at least about 20 to about 150 mg KOH/g or less, or at least about 25 mg KOH/g to about 75 mg KOH/g or less.

The average functionality of these polyether polyols (c) ranges from at least about 2 to about 8 or less. These polyether polyols may also have an average functionality of at least about 2, or at least about 2.5, or at least about 3. These polyether polyols may have an average functionality of 8 or less, or of 6 or less, or of 4 or less. In addition, these polyether polyols may have a functionality between any of the above values, inclusive, such as from at least about 2 to about 8 or less, or from at least about 2.5 to about 6 or less, or from at least about 3 to about 4 or less.

Some examples of suitable polyether polyols for component (c) include those compounds which are conveniently made by reacting compounds having two or more active hydrogens (e.g., glycols, triols, tetrols, hexols, polyfunctional amines and other polyfunctional starters known to those in the art) with one or more equivalents of an epoxide as described earlier. Examples of suitable starters for these polyether polyols (c) include low molecular weight starters such as, for example, glycerin, propylene glycol, dipropylene glycol, ethylene glycol, trimethylolpropane, sucrose, sorbitol, tripropylene glycol, and the like, and mixtures thereof.

Suitable epoxides for component (c) can include, for example, ethylene oxide, propylene oxide, butylene oxide, styrene oxide, etc. and mixtures thereof. The epoxides can be polymerized using well-known techniques and a variety of catalysts, including alkali metals, alkali metal hydroxides and alkoxides, double metal cyanide complexes and many more.

In one embodiment, the novel polyol blends may additionally comprise (d) one or more filled polyols which are also known as polymer polyols. Examples of suitable filled polyols for the invention include, for example, (i) styrene/acrylonitrile polymer polyols, (ii) polyisocyanate polyaddition (PIPA) polyols which are dispersions of polyurethanes formed by the in-situ reaction of an isocyanate and an alkanolamine, (iii) polyhydrazodicarbonamide dispersion polyols (also known as PHD polyols), and (iv) mixtures thereof.

Suitable (i) SAN polymer polyols herein are prepared by free radical polymerization of monomers (i.e. styrene and acrylonitrile) in a polyol carrier (or base polyol) to produce a free radical polymer dispersed in the polyol carrier (or base polyol). Conventionally, the solids content of SAN polymer polyols is from about 5% up to about 60% by weight of solids, based on the total weight of the SAN polymer polyol composition. The solids content may be at least about 5%, or at least about 10% by weight of solids, based on the total weight of the SAN polymer polyol composition. The solids content may also be about 60% by weight or less, or about 50% by weight or less, based on the total weight of the SAN polymer polyol composition. The amount of solids content may range between any combination of these upper and lower ranges, inclusive, such as from about 5% to about 60%, or from about 10% to about 50% by weight of solids, based on the total weight of the SAN polymer polyol composition. Generally, these SAN polymer polyols have a viscosity in the range of from about 2,000 to about 8,000 centipoise.

Examples of suitable SAN polymer polyols to be used as component (d) herein include those SAN polymer polyols disclosed in, for example, but are not limited to, U.S. Pat. Nos. 5,321,077, 5,324,774, 5,364,906, 5,358,984, 5,453, 469, 5,488,085, 5,496, 894, 5,554,662, 5,594,066, 5,814, 699, 5,824,712, 5,916,994, 5,995,534, 5,990,185, 6,117,937, 6,455,603, 6,472,447, 6,624,209, 6,713,599, 6,756,414, 7,179,882, 7,759,423, etc., the disclosures of which are hereby incorporated by reference.

The SAN polymer polyols suitable for the present invention are prepared by the in-situ polymerization of acrylonitrile and styrene, in a base polyol. Suitable base polyols may be conventional polyether polyols, polyester polyols, poly (oxyalkylene) polyols, etc. Methods for preparing SAN polymer polyols are known and described in, for example, U.S. Pat. Nos. 3,304,273; 3,383,351; 3,523,093; 3,652,639; 3,823,201; 4,104,236; 4,111,865; 4,119,586; 4,125,505; 4,148,840; 4,172,825; 4,524,157; 4,690,956; Re-28,715; and Re-29,118, the disclosures of which are hereby incorporated by reference.

One suitable SAN polymer polyol to be used as component (d) in the present invention comprises the free radical polymerization product of styrene and acrylonitrile in a base polyol, wherein the base polyol has a functionality of about 3, a molecular weight of about 4750, and an OH number of about 20. The solids content of this SAN polymer polyol is about 43% solids, in which the styrene to acrylonitrile content is about 64% to 36%.

Another suitable SAN polymer polyol for component (d) in the present invention comprises the free radical polymerization product of styrene and acrylonitrile in a base polyol, wherein the base polyol has a functionality of about 3, a molecular weight of about 3000, and an OH number of about 25. The solids content of this SAN polymer polyol is about 49% solids, in which the styrene to acrylonitrile content is about 67% to 33%.

Suitable polyisocyanate polyaddition (PIPA) polyols for component (d) contain polyurethane particles dispersed in a polyol carrier (i.e. base polyol). The polyurethane particles in PIPA polyols are formed in-situ by the reaction of an isocyanate with an alkanolamine (e.g., triethanolamine). The solids content of the PIPA polyols may typically range from 5% up to about 60% by weight, based on the total weight of the PIPA composition. The solids content may be at least about 5%, or at least about 10% by weight of solids, based on the total weight of the PIPA composition. The solids content may also be about 60% by weight of less, or about 50% by weight or less, based on the total weight of the PIPA composition. The amount of solids content may range between any combination of these upper and lower ranges, inclusive, such as from about 5% to about 60%, or from about 10% to about 50% by weight of solids, based on the total weight of the PIPA composition.

Generally, PIPA polyols have a viscosity in the range of from about 4,000 to about 50,000 centipoise. Examples of suitable PIPA polyols can be found in, for example, U.S. Pat. Nos. 4,374,209 and 5,292,778, the disclosures of which are herein incorporated by reference.

Suitable polyhydrazodicabonamide polyols (which are also commonly referred to as PHD polyols or PHD dispersion polyols) to be used as component (d) of the present invention include, for example, those compounds which are typically prepared by the in-situ polymerization of an isocyanate mixture with an amine group containing compound such as, a diamine and/or a hydrazine, in a base polyol. Suitable base polyols typically comprise polyether polyols and polyoxyalkylene polyols. Methods for preparing PHD polymer polyols are described in, for example, U.S. Pat. Nos. 4,089,835 and 4,260,530, the disclosures of which are hereby incorporated by reference.

PHD polyols typically have solids contents within the range of from about 3 to about 30 wt. %, based on the total weight of the PHD polyol. The solids content of the PHD polyols may be from at least about 3%, or from at least about 5% by weight, based on the total weight of the PHD polyol. The solids content of the PHD polyols may also be about 30% or less, or about 25% by weight or less, based on the total weight of the PHD polyol. The PHD polyols may have a solids content that ranges between any combination of these upper and lower values, inclusive, such as from about 3% to about 30% by weight, or from about 5 to about 25% by wt., based on the total weight of the PHD polyol.

As previously stated, PHD polyols are typically prepared by the in-situ polymerization of an isocyanate mixture in a polyol. More specifically, the isocyanate mixture typically comprises about 80 parts by weight, based on the total weight of the isocyanate mixture, of 2,4-toluene diisocyanate, and about 20 parts by weight, based on the total weight of the isocyanate mixture, of 2,6-toluene diisocyanate.

Suitable amine group containing compounds to be polymerized with the isocyanate compound include in preparing the PHD polyols, for example, compounds such as polyamines, hydrazines, hydrazides, ammonia or mixtures of ammonia and/or urea and formaldehyde.

Suitable polyamines include divalent and/or higher valent primary and/or secondary aliphatic, araliphatic, cycloaliphatic and aromatic amines, e.g. ethylene diamine; 1,2- and 1,3-propylene diamine; tetramethylene diamine; hexamethylene diamine; dodecamethylene diamine; trimethyl diaminohexane; N,N'-dimethyl-ethylenediamine; 2,2'-bisaminopropyl-methylamine; higher homologues of ethylene diamine, such as diethylene triamine, triethylene tetramine and tetraethylene pentamine; homologues of propylene diamine, such as dipropylene triamine, piperazine, N,N'-bis-aminoethyl-piperazine, triazine, 4-aminobenzylamine, 4-aminophenyl ethylamine, 1-amino-3,3,5-trimethyl-5-aminomethylcyclohexane, 4,4'-diaminodicyclohexyl-methane and -propane, 1,4-diaminocyclohexane, phenylenediamines, naphthylene diamines; condensates of aniline and formaldehyde; tolylene diamines; the bis-aminomethylbenzenes and derivatives of the above mentioned aromatic amines monoalkylated on one or both nitrogen atoms. The polyamines generally have a molecular weight of from 48 to 10,000. They may also have molecular weights of 60 to 1000, or of 62 to 200.

The hydrazines used may be hydrazine itself or mono-substituted or N,N'-disubstituted hydrazines. The substituents may be $C_1$ to $C_6$ alkyl groups, cyclohexyl groups or phenyl groups. The hydrazines generally have a molecular weight of from 32 to 200. Hydrazine itself is suitable for the invention herein.

Suitable hydrazides include the hydrazides of divalent or higher valent carboxylic acids such as carbonic acid, oxalic acid, malonic acid, succinic acid, adipic acid, sebacic acid, azelaic acid, maleic acid, fumaric acid, phthalic acid, isophthalic acid, and terephthalic acid; the esters of a hydrazine monocarboxylic acid with dihydric or higher hydric alcohols and phenols such as ethanediol, propane-1,2-diol, butane-1,2-diol, -1,3-diol and -1,4-diol, hexanediol, diethyleneglycol, triethyleneglycol, tetraethyleneglycol, dipropyleneglycol, tripropyleneglycol and hydroquinone; and the amides of hydrazinomonocarboxylic acid (semicarbazides), e.g. with the above mentioned diamines and polyamines. The hydrazides generally have a molecular weight of from 70 to 10,000, or from 75 to 1000, or from 90 to 500. Any combination of these upper and lower limits for molecular weights can be used for the hydrazides herein.

In special cases, a proportion of isocyanates or amines, hydrazines and hydrazides which have a functionality higher than 2 may also be used, especially in combination with the corresponding monofunctional compounds.

In accordance with the present invention, preferred base polyols for preparing the PHD polyols comprise polyether polyols and poly(oxyalkylene) polyols.

PHD polymer modified polyols are typically prepared by the in-situ polymerization of an isocyanate mixture with a diamine and/or hydrazine in a base polyol, preferably, a polyether polyol. Methods for preparing PHD polymer polyols are described in, for example, U.S. Pat. Nos. 4,089,835, 4,260,530 and 4,324,715, the disclosures of which are hereby incorporated by reference.

A process for the preparation of these novel polyol compositions comprises:

(I) the in-situ production of a polyol blend which comprises:
  A) introducing into a reaction vessel a mixture comprising:
    (1) an initial starter ($S_i$) comprising one or more monofunctional compounds having a hydroxyl number of less than about 56,
    and
    (2) a DMC (double metal cyanide) catalyst,
  B) feeding
    (1) an epoxide comprising propylene oxide and ethylene oxide in a weight ratio of from 100:0 to 20:80, into the reaction vessel;
  C) allowing said epoxide mixture and said initial starter ($S_i$) to react and continuing to polymerize by feeding the epoxide until the equivalent weight of the monofunctional compound is increased by at least 10% by weight and reaches a value between about 1,500 and about 6,000;
  D) continuously adding
    (1) one or more low molecular weight starters ($S_c$) having a functionality of greater than 2 to about 6, and an equivalent weight of about 28 to about 400 into the reaction vessel while continuing to feed epoxide;
  E) completing addition of the continuous starter ($S_c$); and
  F) allowing the mixture to continue to polymerize in the reaction vessel until the resultant polyol blend has an overall hydroxyl number of from about 56 to about 250, an average functionality of greater than 2, and comprises
    (1) from about 25 to 75% by weight, based on 100% by weight of F)(1) and F)(2), of one or more polyether monols having a hydroxyl number of less than 56, and containing less than 20% by weight of copolymerized oxyethylene, based on 100% by weight of F)(1);
    and
    (2) from about 25 to 75% by weight, based on 100% by weight of F)(1) and F)(2), of one or more polyether polyols having a hydroxyl number of about 47 to about 300, an average functionality of greater than 2 to about 6, and containing from about 5 to about 45% by weight of copolymerized oxyethylene, based on 100% by weight of F)(2);
and
(II) blending or mixing the resultant in-situ produced blend, with
  A) at least one polyether polyol which is characterized by an average functionality of 2 to 8, a hydroxyl number of 20 to 240 and containing at least 50% of copolymerized oxyethylene, based on 100% by weight of the polyether polyol A).

In general, any epoxide polymerizable using DMC catalysis can be used in the process for the in-situ production of the polyol blend comprising a polyether monol and a polyether polyol. Suitable epoxides include ethylene oxide, propylene oxide, butylene oxides (e.g., 1,2-butylene oxide, isobutylene oxide), styrene oxide, and the like, and mixtures thereof. Polymerization of epoxides using DMC catalysts and hydroxyl-containing starters results in polyether polyols, as is well understood in the art.

Other monomers that will copolymerize with an epoxide in the presence of a DMC catalyst may be included in the process of the invention to make other types of epoxide polymers. Some examples include epoxides copolymerize with oxetanes as described in U.S. Pat. No. 3,404,109, the disclosure of which is herein incorporated by reference, to give polyethers, or with anhydrides to give polyesters or polyetheresters as described in U.S. Pat. Nos. 5,145,883 and 3,538,043, the disclosures of which are herein incorporated by reference.

In accordance with this process, an initially charged starter ($S_i$) is used, and the initially charged starter ($S_i$) is different than the continuously added starter ($S_c$). The initially charged starter, $S_i$, is comprised of, either totally or in large part, one or more compounds having one active hydrogen per molecule that can serve as a site for epoxide addition. The preferred starters are polyether monols formed by addition of multiple equivalents of epoxide to low molecular weight monofunctional starters such as, for example, methanol, ethanol, phenols, allyl alcohol, longer chain alcohols, etc., and mixtures thereof. Suitable epoxides can include, for example, ethylene oxide, propylene oxide, butylene oxide, styrene oxide, etc. and mixtures thereof. The epoxides can be polymerized using well-known techniques and a variety of catalysts, including alkali metals, alkali metal hydroxides and alkoxides, double metal cyanide complexes, and many more. Suitable monofunctional starters can also be made, for example, by first producing a diol or triol and then converting all but one of the remaining hydroxyl groups to an ether, ester or other non-reactive group.

One suitable class of polyether monol starters, $S_i$, includes polyoxypropylene monols having a hydroxyl number of less than about 56. These compounds facilitate DMC catalyzed addition of epoxide and provide suitable build ratios for the production of the in-situ formed polyether polyol blends herein.

In the process of the present invention, the quantity of an $S_i$ used depends on many factors, including, for example, the reactor dimensions, the identity of the $S_i$, the equivalent weights of the $S_i$ and of the target product, the equivalent weight of the $S_c$, and other factors. In general, the amount of $S_i$ is within the range of about 2 to about 75 mole % of the total moles of $S_i$ and $S_c$. The total amount of starter ($S_t$) equals the sum of the amount of continuously added starter ($S_c$) plus the amount of initially charged starter ($S_i$). Thus, $S_t = S_c + S_i$.

The suitable catalysts comprise a double metal cyanide (DMC) catalyst. Any DMC catalyst known in the art is suitable for use in the process of the present invention. These well-known catalysts are the reaction products of a water-soluble metal salt (e.g., zinc chloride) and a water-soluble metal cyanide salt (e.g., potassium hexacyanocobaltate). Preparation of suitable DMC catalysts is described in many references, including, for example, U.S. Pat. Nos. 5,158,922, 4,477,589, 3,427,334, 3,941,849, 5,470,813, and 5,482,908, the disclosures of which are incorporated herein by reference. One suitable type of DMC catalysts are zinc hexacyanocobaltates.

The DMC catalyst includes an organic complexing agent. As disclosed in the preceding references, the complexing agent is needed for an active catalyst. Suitable complexing agents are water-soluble heteroatom-containing organic compounds that can complex with the DMC compound, as well as water-soluble aliphatic alcohols. An example of a suitable aliphatic alcohol is tert-butyl alcohol. The DMC catalyst may include, in addition to the organic complexing agent, a polyether, as is described in U.S. Pat. No. 5,482,908, the disclosure of which is herein incorporated by reference.

Suitable DMC catalysts for use in the process are highly active catalysts such as those described in U.S. Pat. Nos. 5,482,908 and 5,470,813, the disclosures of which are herein incorporated by reference. High activity allows the catalysts to be used at very low concentrations, and possibly at concentrations which are low enough to overcome any need to remove the catalyst from the finished blends of in-situ formed polyol blends.

The process of the invention also requires a continuously added polyfunctional starter ($S_c$). Conventional processes for making polyether polyols, including KOH-catalyzed and DMC-catalyzed processes, charges the catalyst and all of the starter to be used to the reactor at the start of the polymerization, and then adds the epoxide continuously. In the process of the invention, the DMC catalyst and an initial monofunctional starter ($S_i$) are charged to the reactor followed by epoxide feed and polymerization until the monol reaches the desired equivalent weight. At this point, the feed of continuously added polyfunctional starter ($S_c$) is begun and it proceeds at a continuous controlled rate relative to the continuing epoxide feed until the addition of the continuous starter ($S_c$) is completed. Epoxide feed is continued until the desired overall OH number, is reached. The $S_c$ may be mixed with the epoxide and added, or it may be added as a separate stream.

The $S_c$ is typically a low molecular weight polyol or a blend of low molecular weight polyols. Low molecular weight polyols as defined in this application have from about 2 hydroxyl groups to about 8 hydroxyl groups. It also may be beneficial to add more than one $S_c$ having different functionalities either simultaneously or sequentially. The functionality of the $S_c$ or multiple $S_c$ should be chosen such at the overall functionality of the resultant polyol is greater than 2.0 up to about 6, or from about 2.5 up to about 3. These low molecular weight polyols may have at least about 2 hydroxyl groups, or greater than 2 hydroxyl groups, or at least about 2.5 hydroxyl groups. These low molecular weight polyols may also have about 8 hydroxyl groups or less, or about 6 hydroxyl groups or less, or about 3 hydroxyl groups or less. The low molecular weight polyols used for the $S_c$ may contain any number of hydroxyl groups which ranges between any combination of these upper and lower values, inclusive, such as from at least 2 hydroxyl groups to about 8 hydroxyl groups or less, or greater than about 2 to about 6, or at least about 2.5 to about 3 hydroxyl groups or less.

Suitable low molecular weight polyols for the $S_c$ have an average functionality of greater than 2 to about 8 and an equivalent weight of about 28 to about 400.

Examples of suitable low molecular weight polyols include compounds such as, for example, glycerin, propylene glycol, dipropylene glycol, ethylene glycol, trimethylolpropane, sucrose, sorbitol, tripropylene glycol, and the like, and mixtures thereof. In one embodiment, the continuously added starter comprises propylene glycol and glycerin. Low molecular weight polyether polyols prepared by multiple epoxide addition to these polyols or other starters with two or more active hydrogens may also be employed as $S_c$.

The $S_c$ can also be other compounds having at least two active hydrogens per molecule, which are known to be suitable initiators for conventional DMC-catalyzed epoxide polymerizations, including compounds such as, for example, alcohols, thiols, aldehydes and ketones containing enolizable hydrogens, malonic esters, phenols, carboxylic acids and anhydrides, aromatic amines, acetylenes, and the like, and mixtures thereof. Examples of suitable active hydrogen-containing compounds appear in U.S. Pat. Nos. 3,900,518, 3,941,849, and 4,472,560, the disclosures of which are incorporated herein by reference.

The amount of $S_c$ used is at least about 25 mole percent of the total amount of starter used.

$$\text{mole \% } S_c = \left( \frac{\text{moles } S_c}{\text{moles } S_c + \text{moles } S_i} \right) \times 100$$

As described previously, a wide variety of epoxides can be employed in the current process. Propylene oxide and ethylene oxide are the most commonly used epoxides. A unique feature of the current process is that the compositions of the epoxide can be varied to control the composition of the polyether monol and polyether polyol constituents in the final product. For example, propylene oxide can be added alone during polymerization of the monol, prior to the start of the addition of the $S_c$, the continuously added starter. After $S_c$ addition is started, a blend of ethylene oxide and propylene oxide can be fed to yield a high functionality polyether polyol comprised of a poly(oxyethylene-oxypropylene) copolymer. Because oxide addition via DMC catalysis occurs predominantly on the lower equivalent weight polyether polyol, the polyether monol component can remain largely poly(oxypropylene). By reversing these sequences, the polyether monol could be produced with higher poly(oxyethylene) content and the polyether polyol could be predominantly poly(oxypropylene).

The epoxide composition may also be varied during the initial polymerization of the monol and/or at some point during and/or after the addition of $S_c$. This provides flexibility for controlling the distribution of oxyethylene or oxypropylene within the polyether monol and polyether polyol and allows some control of the primary versus secondary hydroxyl functionality of the polyether monol and polyether polyol, and thus, the relative reactivity of the constituents in the final composition. In this way, it is possible to design the product to meet the reactivity and performance requirements of the intended applications such as polyurethane foams.

The resultant polyol blend formed in F) has an overall hydroxyl number of from about 56 to about 250. This polyol blend may have a hydroxyl number of at least about 56, or of at least about 75. This polyol blend may also have a hydroxyl number of about 250 or less, or of about 150 or less. The polyol blend F) may have a hydroxyl number ranging between any combination of these upper and lower values, inclusive, such as from at least about 56 to about 250 or less, or from at least about 75 to about 150 or less.

The resultant polyol blend formed in F) typically has a functionality of greater than about 2. This polyol blend may have a functionality of greater than about 2, or at least about 2.1. This polyol blend may also have a functionality of about 6 or less, or of about 4 or less. The polyol blend F) may have a functionality which ranges between any combination of these upper and lower values, inclusive, such as from greater than about 2 to about 6 or less, or from at least about 2.1 to about 4 or less.

Suitable polyether polyols to be used as component (II)A) in this process are characterized by an average functionality of 2 to 8, a hydroxyl number of 20 to 240 and comprising at least 50% of copolymerized oxyethylene, based on 100% by weight of the polyether polyol (II)A).

These polyether polyols may have hydroxyl numbers of from at least about 20 mg KOH/g, or at least about 30 mg KOH/g, or at least about 35 mg KOH/g. In addition, the polyether polyols generally have hydroxyl numbers of about 240 mg KOH/g or less, or about 170 mg KOH/g or less, or about 50 mg KOH/g or less. The suitable polyether polyols of the present invention may be characterized by a hydroxyl number between any of the above values, inclusive, unless otherwise stated, such as, from at least about 20 to about 240 mg KOH/g or less, or at least about 30 to about 170 mg KOH/g or less, or at least about 35 mg KOH/g to about 50 mg KOH/g or less.

The average functionality of these polyether polyols ranges from at least about 2 to about 8 or less. These polyether polyols may also have an average functionality of at least about 2, or at least about 2.5, or at least about 3. These polyether polyols may have an average functionality of 8 or less, or of 6 or less, or of 4 or less. In addition, these polyether polyols may have a functionality between any of the above values, inclusive, such as from at least about 2 to about 8 or less, or from at least about 2.5 to about 6 or less, or from at least about 3 to about 4 or less.

Suitable polyether polyols used as component (II)A) also contain at least 50% to about 99% by weight or less of copolymerized oxyethylene, based on 100% by weight of the polyether polyol. This weight percent includes the starter or initiator, and the all of the added epoxide(s). These polyether polyols may contain at least about 50%, or at least about 60% or at least about 70% by weight, of copolymerized oxyethylene, based on 100% by weight of the polyether polyol. These polyether polyols may also contain about 99% or less, or about 90% or less, or about 85% or less of copolymerized oxyethylene, based on 100% by weight of the polyether polyol. Suitable polyether polyols herein may contain any amount of copolymerized oxyethylene between the above disclosed values, inclusive, such as from at least about 50% to about 99% or less, or from at least about 60% to about 90% or less, or from at least about 70% to about 85% by weight or less, of copolymerized oxyethylene.

Some examples of suitable polyether polyols for component (II)A) include those compounds which are conveniently made by reacting compounds having two or more active hydrogens (e.g., glycols, triols, tetrols, hexols, polyfunctional amines and other polyfunctional starters known to those in the art) with one or more equivalents of an epoxide as described earlier. Examples of suitable starters for these polyether polyols (II)A) include low molecular weight starters such as, for example, glycerin, propylene glycol, dipropylene glycol, ethylene glycol, trimethylolpropane, sucrose, sorbitol, tripropylene glycol, and the like, and mixtures thereof.

These polyether polyols can have any desired arrangement of oxyalkylene units with the proviso that they contain at least 50% of copolymerized oxyethylene, based on the 100% by weight of the polyether polyol. Thus, the polyether polyols (II)A) can be EO homopolymers, block EO-PO copolymers, EO-capped polyoxypropylenes, PO capped polyoxyethylenes, random EO/PO copolymers, PO polymers that are "tipped" with a mixture of EO and PO to achieve the desired amount of copolymerized oxyethylene and/or a particular primary hydroxyl content, or any other desired configuration.

In one embodiment of the above process, the novel polyol blends may additionally comprise (II)B) one or more polyether polyols having an OH number of from about 10 to about 300 and a functionality of about 2 to about 8.

Suitable compounds to be used as polyether polyols (II)B) include polyether polyols which have a functionality of at least about 2 to about 8 or less, a hydroxyl number of at least about 10 to about 300 or less, and contain from 0% to about 45% by weight of copolymerized oxyethylene, based on 100% by weight of the polyether polyol (II)B). These polyether polyols are different than the polyether polyols F)(2). Suitable polyether polyols are described above as component (c) in the novel polyol blends.

These polyether polyols may have hydroxyl numbers of from at least about 10 mg KOH/g, or at least about 20 mg KOH/g, or at least about 25 mg KOH/g. In addition, the polyether polyols generally have hydroxyl numbers of about 300 mg KOH/g or less, or about 150 mg KOH/g or less, or about 75 mg KOH/g or less. The suitable polyether polyols of the present invention may be characterized by a hydroxyl number ranging between any of the above values, inclusive, unless otherwise stated, such as, from at least about 10 to about 300 mg KOH/g or less, or at least about 20 to about 150 mg KOH/g or less, or at least about 25 mg KOH/g to about 75 mg KOH/g or less.

The average functionality of these polyether polyols ranges from at least about 2 to about 8 or less. These polyether polyols may also have an average functionality of at least about 2, or at least about 2.5, or at least about 3. These polyether polyols may have an average functionality of 8 or less, or of 6 or less, or of 4 or less. In addition, these polyether polyols may have a functionality ranging between any of the above values, inclusive, such as from at least about 2 to about 8 or less, or from at least about 2.5 to about 6 or less, or from at least about 3 to about 4 or less.

In one embodiment of the above process, the novel polyol blends may additionally comprise (II)C) one or more filled polyols or polymer polyols. Examples of suitable filled polyols for the invention include, for example, (i) styrene/acrylonitrile polymer polyols, (ii) polyisocyanate polyaddition (PIPA) polyols which are dispersions of polyurethanes formed by the in-situ reaction of an isocyanate and an alkanolamine, (iii) polyhydrazodicarbonamide dispersion polyols (also known as PHD polyols), and (iv) mixtures thereof. Suitable filled polyols are described in detail above as component (d) for the novel polyol compositions.

In one embodiment of the above process, the novel polyol blends comprise at least one (II)B) one or more polyether polyols, which are different from F)(2), and have a functionality of at least about 2 to about 8 or less, a hydroxyl number of at least about 10 to about 300 or less, and contain from 0% to about 45% by weight of copolymerized oxyethylene, based on 100% by weight of the polyether polyol (II)B); and/or (II)C) one or more filled polyols.

The process for the production of an open, celled flexible polyurethane foam comprises reacting an isocyanate-functional component with an isocyanate-reactive component in the presence of components comprising a blowing agent, a catalyst, and a surfactant, wherein the isocyanate-functional component and the isocyanate-reactive component are reacted at an isocyanate index of 90 to 120. Suitable isocyanate-reactive components comprise: (a) from 20 to 80% by weight, based on 100% by weight of components (a) and (b), of an in-situ formed polyol blend having a hydroxyl number of from about 56 to about 250, an average functionality greater than about 2 and comprising: (i) from 25 to 75% by weight, based on the total weight of (i) and (ii), of one or more polyether monols having a hydroxyl number of less than 56, and containing less than 20% by weight of copolymerized oxyethylene, based on 100% by weight of (a)(i); and (ii) from 25 to 75% by weight, based on the total weight of (i) and (ii), of one or more polyether polyols having a hydroxyl number of about 47 to about 300, an average functionality of greater than 2 to about 6, and containing from about 5 to about 45% by weight of copolymerized oxyethylene, based on 100% by weight of (a)(ii); and (b) from 20 to 80% by weight, based on 100% by weight of component (a) and component (b), of one or more polyether polyols having a functionality of 2 to 8, a hydroxyl number of 20 to 240 and comprising at least 50% of copolymerized oxyethylene, based on 100% by weight of component (b).

Suitable compounds for isocyanate-reactive components (a)(i), (a)(ii) and (b) are as described hereinabove in the novel polyol composition.

In addition, the isocyanate-reactive component may additionally comprise at least one of: (c) one or more polyether polyols having an OH number of from about 10 to about 300, a functionality of from about 2 to about 8, and that contains from 0 to 45% by weight of copolymerized oxyethylene, based on 100% by weight of component (c); and/or (d) one or more filled polyols. Suitable polyether polyols are described herein above with respect to the novel polyol compositions. Suitable filled polyols include (i) styrene/acrylonitrile polymer polyols, (ii) polyisocyanate polyaddition (PIPA) polyols which are dispersions of polyurethanes formed by the in-situ reaction of an isocyanate and an alkanolamine, (iii) polyhydrazodicarbonamide dispersion polyol (PHD polyols), or (iv) mixtures thereof. The filled polyols are also described above with respect to the novel polyol compositions.

Suitable isocyanate-functional components include polyisocyanates which contain two or more free NCO groups per molecule and are those conventionally used to make flexible polyurethane foam. Useful polyisocyanates include aromatic, aliphatic, and cycloaliphatic di- and polyisocyanates. Examples include toluene diisocyanates (TDI), diphenylmethane diisocyanates (MDI), naphthalene diisocyanates, isophorone diisocyanate, hexamethylene diisocyanates (HDI), polymeric MDIs, and polyisocyanates modified with carbodiimide, ester, urea, urethane, allophanate, isocyanurate, biuret, or other functionalities, and the like, and mixtures thereof. Suitable polyisocyanates include toluene diisocyanate (TDI, which is usually a mixture of 2,4- and 2,6-isomers), diphenylmethane diisocyanate (MDI which is usually a mixture of the 2,2'-, the 2,4'- and the 4,4'-isomers), and various mixtures thereof. Also suitable are diphenylmethane diisocyanates which have a monomeric MDI content of at least 50% by weight, or of at least 60% by weight.

The process of the invention may be at an isocyanate index of from about 85 to about 120, preferably 95 to 105.

In one embodiment according to the invention, a foam modifier or foam processing aid is added to the formulation to enhance processing and help stabilize the foam against cold flow and/or dishing by providing dimensional stability against deformation and reduced settling of the foam. These processing aids or modifiers are typically chain extenders and/or cross-linking agents. In general, chain extenders and/or cross-linking agents are relatively small molecules which contain from 2 to 8 active hydrogen groups. The chain extenders and/or cross-linking agents may contain at least 2 active hydrogen groups, or at least 3 active hydrogen groups. Chain extenders and/or cross-linking agents may also contain less than or equal to 8 active hydrogen groups, or less than or equal to 6 active hydrogen groups. Suitable chain extenders and/or cross-linking agents may contain any number of active hydrogen groups in any combination ranging between these upper and lower values, inclusive, such as at least 2 to less than or equal to 8 active hydrogen groups, or at least 3 to less than or equal to 6 active hydrogen groups. Suitable chain extenders and/or cross-linking agents are added in amounts of from 0 to 4 parts per hundred parts of polyol. Some examples of suitable chain extenders and/or cross-linking agents that may be included in the reaction mixture of the invention include diethanolamine (DEOA), ethylene glycol (EG), diethylene glycol (DEG), propylene glycol (PG), dipropylene glycol (DPG), 1,4-butanediol (BDO), Arcol DP1022, Ortegol 204, Geolite 206 and Geolite 210. Some of these aids are described in, for example, U.S. Pat. Nos. 4,950,694 and 5,539,011, the disclosures of which are hereby incorporated by reference. Processing additives are particularly useful in accordance with the invention when TDI is used as the isocyanate component. These chain extenders and/or cross-linking agents may be present in amount of 0 parts or higher, or of 0.3 parts or higher, per hundred parts of polyol. The chain extenders and/or crosslinking agents may also be present in amounts of 4 parts or less, or of 2 parts or less, per hundred parts of polyol. The amount of chain extenders and/or crosslinking agent present may range between any combination of these upper and lower values, inclusive, such as from 0 to 4 parts, or from 0.3 to 2 parts per hundred parts polyol. It may also be beneficial at times to use a combination of these different foam modifiers or processing aids.

In addition, the foam modifiers or processing aids may have an OH number of at least 300, or of at least 600.

One definition of cold flow is the distortion, deformation or dimensional change which takes place in materials under continuous load at ambient temperature (source: CRC Press LLC, 1989). By "continuous load" it is meant the slabstock foam's own weight. A deformed appearance on the part of the slabstock foam is linked to an inhomogeneous distribution of the density throughout the entire foam and hence also some variance in the impression resistance. An example of cold flow is shown in FIG. 1B. Dishing is similar to cold flow but the sides and top of the foam block can pucker in as shown in FIG. 1C. The use of these modifiers will help obtain foam with good cold-flow properties which for the purposes of the present invention refer to good dimensional stability against deformation and preferably also reduced settling on the part of the foam, as shown in FIG. 1A, preferably paired with a uniform density distribution for the same impression resistance.

Suitable blowing agents for the present invention include, for example chemical blowing agents, i.e. isocyanate reactive agents that generate blowing gases, such as for example water and formic acid and physical blowing agents such as acetone, carbon dioxide, chlorofluorocarbons, highly fluorinated and/or perfluorinated hydrocarbons, chlorinated hydrocarbons, aliphatic and/or cycloaliphatic hydrocarbons such as propane, butane, pentane, hexane, etc., or acetals such as methylal. These physical blowing agents are usually added to the polyol component of the system. However, they can also be added in the isocyanate component or as a combination of both the polyol component and the isocyanate component. It is also possible to use them together with highly fluorinated and/or perfluorinated hydrocarbons, in the form of an emulsion of the polyol component. If emulsifiers are used, they are usually oligomeric acrylates which contain polyoxyalkylene and fluoroalkane radicals bonded as side groups and have a fluorine content of from about 5 to 30% by weight. Such products are sufficiently well known from plastics chemistry, and are described in U.S. Pat. No. 4,972,002, the disclosure of which is herein incorporated by reference.

The amount of blowing agent or blowing agent mixture used may range from 0.5 to 20% by weight, based on 100% by weight of the isocyanate-reactive component. In some instances, the amount of blowing agent present may be at least 0.5% or at least 0.75% by weight, based on 100% by weight of the isocyanate-reactive component. The amount of blowing agent present may also be about 20% or less, or about 10% by weight or less, based on 100% by weight of the isocyanate-reactive component. The blowing agent may be present in any amount ranging between any combination of the above values, inclusive, such as from at least about 0.5% to about 20% or less, or from at least about 0.75% to about 10% by weight or less, based on 100% by weight of isocyanate-reactive component.

When water is the blowing agent, the amount of water typically present can range from at least about 0.5 to about 10%, based on 100% by weight of the isocyanate-reactive component. In some instances, the amount of blowing agent present may be at least 0.5% or at least 0.75% by weight, based on 100% by weight of the isocyanate-reactive component. The amount of water present as a blowing agent may also be about 10% or less, or about 7% by weight or less, based on 100% by weight of the isocyanate-reactive component. The blowing agent may be present in any amount ranging between any combination of the above values, inclusive, such as from at least about 0.5% to about 10% or less, or from at least about 0.75% to about 7% by weight or less, based on 100% by weight of isocyanate-reactive component. The addition of water can be effected in combination with the use of the other blowing agents described. In accordance with the present invention, water is the preferred blowing agent. Also, preferred is the use of water along with pressurized carbon dioxide that is dispersed in the polyol or resin blend and frothed by passing through a pressure let down device such as employed for example in the Henecke Novaflex, CarDio (Cannon Viking Limited) and Beamech (CO-2) machines, which are known by those skilled in the art.

The foam is produced in the presence of a surfactant, which helps to stabilize the foam until it cures. Suitable surfactants are those well known in the polyurethane industry. A wide variety of organosilicone surfactants are commercially available. Examples of suitable surfactants are Niax L-620 surfactant, a product of Momentive Performance Materials, and Tegostab B8244, a product of Evonik-Goldschmidt. Many other silicone surfactants known to those in the art may be substituted for these suitable silicones. The surfactant is typically used in an amount within the range of from at least about 0.1 to about 4 parts, per 100 parts of isocyanate-reactive mixture. Surfactants may be present in amounts ranging from at least about 0.1, or from at least about 0.2 parts per 100 parts of isocyanate-reactive mixture.

The surfactants may be also present in amounts ranging from about 4 parts or less, or about 3 parts or less, per 100 parts of isocyanate-reactive mixture. The amount of surfactants may range between any combination of these upper and lower values, inclusive, such as from at least about 0.1 to about 4 parts, or from at least about 0.2 to about 3 parts, per 100 parts of isocyanate-reactive mixture.

At least one polyurethane catalyst is required to catalyze the reactions of the isocyanate-reactive components and water with the polyisocyanate. It is common to use both an organoamine and an organotin compound for this purpose. Suitable polyurethane catalysts are well known in the art; an extensive list appears in U.S. Pat. No. 5,011,908, the disclosure of which is herein incorporated by reference. Suitable organotin catalysts include tin salts and dialkyltin salts of carboxylic acids. Examples include stannous octoate, dibutyltin dilaurate, dibutyltin diacetate, stannous oleate, and the like. Stannous octoate is particularly preferred. Preferred organoamine catalysts are tertiary amines such as trimethylamine, triethylamine, triethylenediamine, bis(2,2'-dimethyl-amino)ethyl ether, N-ethylmorpholine, diethylenetriamine, and the like.

In another embodiment, suitable amine catalysts include non-emissive balanced amines which bind chemically into the polyurethane foam matrix and eliminate contributions to odor and VOC emissions or is of high enough molecular weight so as to not to contribute to VOC emissions. These are also referred to as non-fugitive amine catalysts. Examples of these catalysts include Dabco NE-300 and Dabco NE-500 from Air products, N,N-bis(3-dimethyl-aminopropyl)-N-isopropanolamine (commercially available as Jeffcat ZR 50), N-(3-dimethylaminopropyl)-N,N-diisopropanolamine (commercially available as Jeffcat DPA), 1,4-diazabicyclo[2.2.2]octane-2-methanol (commercially available as RZETA) from TOSOH Corporation.

The polyurethane catalysts are typically used in an amount within the range of about 0.01 to about 3 parts per 100 parts of isocyanate-reactive mixture. The polyurethane catalysts may be present in amounts of from at least about 0.01, or from at least about 0.1 parts per 100 parts of isocyanate-reactive mixture. The polyurethane catalysts may be present in amounts of about 3 parts or less, or of about 2 parts per 100 parts of isocyanate-reactive mixture. The polyurethane catalysts may be present in any amount ranging between any combination of these upper and lower values, inclusive, such as from at least about 0.01 to about 3 parts, or from at least about 0.1 to about 2 parts, per 100 parts of isocyanate-reactive mixture.

Flame retardants, antioxidants, pigments, dyes, liquid and solid fillers, and many other commercial additives can also be included in the foams in conventional amounts.

The foams are prepared using methods that are well known in the industry. These methods may include continuous or discontinuous free-rise slabstock foam processes and molded foam processes. In a typical slabstock process, the isocyanate is continuously mixed together with the other formulation chemicals by passing through a mixing head and then into a trough which overflows onto a moving conveyor.

Alternatively, the reacting mixture is deposited directly onto the moving conveyor. In another embodiment, high pressure liquid carbon dioxide is fed into one or more of the formulation components, typically the polyol, entering into the mixing head and the resin blend is passed through a frothing device where the pressure is let down and the resultant froth is deposited onto the conveyor. The foam expands and rises as it moves down the conveyor to form a continuous foam slab that is cut into blocks or buns of the desired length for curing and storage. After curing for one or more days, these foam buns can be cut into the desired shapes for the end-use applications. In the discontinuous process, the reactants are quickly mixed together through a head or in a large mixing chamber. The reaction mixture is then deposited into a large box or other suitable container where foam expansion occurs to form a bun of the lateral dimensions of the container.

A typical molded foam process usually employs a one-shot approach in which a specific amount of the isocyanate stream (the "A" side) is rapidly combined and mixed with a specific amount of the remaining formulation components (the "B" side). An additional stream may be employed to bring in one or more specific components not included with the "B" side stream. The mixture is quickly deposited into a mold that is then closed. The foam expands to fill the mold and produce a part with the shape and dimensions of the mold.

Although less preferred, a prepolymer approach to making the foams can also be used. In this approach, a significant portion of the isocyanate-reactive mixture is reacted with the polyisocyanate, and the resulting prepolymer is then reacted with the remaining components.

As used and referred to throughout the specification, air flow was measured in accordance with the NOPCO test procedure described by R. E. Jones and G. Fesman, "Journal of Cellular Plastics," January, 1965, Vol. No. 1, pp. 200-216, the disclosure of which is herein incorporated by reference, using a Amscor Model 1377 automated foam porosity tester. A 2 inch×2 inch×1 inch piece of foam was cut from near the center of the test specimens which itself was cut from the foam blocks after production. Air flow, expressed as standard cubic feet per minute (i.e. scfpm), was measured through the 1 inch thickness at a pressure differential of 0.5 inches of water less than atmospheric pressure. The air flow was in the direction of rise of the foam.

The test used to define foam recovery rate from deformation is the 95% height recovery time as described in ASTM D 3574-11 Test M. A recovery rate of less than 3 seconds, indicates a fast recovering foam such as observed for resilient foam types. A recovery rate of greater than or equal to 3 seconds is indicative of a slow recovery foam often referred to as "viscoelastic" or "memory" foam.

Other foam physical properties reported in the examples were measured per the standard procedures described in ASTM D3574-11.

Commercial production of open celled foams involves mixing together a suitable polyisocyanate, a blowing agent, and an isocyanate-reactive component or mixture in the presence of a surfactant, one or more catalysts, and various other compounds which are known in the field of polyurethane chemistry to be suitable for preparing open celled foams. Other isocyanate-reactive compounds to be used in addition to the above described polyol blends which comprise (a) the in-situ formed polyol blend and (b) the polyether polyol having a functionality of 2 to 8, a hydroxyl number of 20 to 240 and comprising at least 50% by weight of copolymerized oxyethylene, based on the total weight of the polyether polyol, include other conventional polyols which are well known in the field of polyurethane chemistry. These include the relatively high molecular weight compounds such as, for example, polyether polyols, polyester polyols, polymer polyols, amine-terminated polyethers, polythioethers, polyacetals and polycarbonates, as well as various low molecular weight chain extenders and/or cross-linking agents both of which may contain hydroxyl groups and/or amine groups capable of reacting with the isocyanate groups of the isocyanate component.

In addition, the isocyanate-reactive component to be used in the open celled flexible polyurethane foams herein may additionally comprise at least one of (c) one or more polyether polyol having an OH number of from about 10 to about 300, a functionality of from about 2 to about 8, and which contain from 0 to 45% by weight of copolymerized oxyethylene, based on 100% by weight of component (c); and/or (d) one or more filled polyols which are also commonly referred to as polymer polyols.

FIG. 1A is a cross-sectional view of a standard foam block prepared in accordance with the present invention in which a processing aid or foam modifier was added to the foam formulation. This foam exhibited good cold-flow-properties which, in accordance with the instant invention, refers to good dimensional stability against deformation and had reduced settling, and was paired with a uniform density distribution for the same impression resistance. The foams in Examples 1-4 of the present application were prepared using a foam modifier and each of these foams formed a standard foam block as in FIG. 1A.

FIG. 1B is a cross-sectional view of a foam block prepared without a foam modifier, in which the foam block exhibited cold flow. As discussed herein, cold flow is the distortion, deformation or dimensional change which takes place in foams under continuous load at ambient temperature (source: CRC Press LLC, 1989). By "continuous load" it is meant the slabstock foam's own weight. A deformed appearance on the part of the slabstock foam is linked to an inhomogeneous distribution of the density throughout the entire foam and hence also some variance in the impression resistance. Foam blocks which exhibit cold flow are usually trapezoidal in shape. The foam of FIG. 1B is not illustrative of the present invention.

FIG. 1C is a cross-sectional view of a foam block prepared without a foam modifier in which the foam exhibited dishing. Dishing is similar to cold flow but the sides and top of the foam block can pucker in as shown in FIG. 1C. As a result of dishing, the top surface and sides of the foam block become concave and are no longer trapezoidal in shape. The foam of FIG. 1C is not illustrative of the invention.

Certain embodiments of the present invention, therefore, are directed to a novel polyol composition comprising (a) from 20 to 98% by weight, based on 100% by weight of component (a) and component (b), of an in-situ formed polyol blend having a hydroxyl number of from about 56 to about 250, an average functionality greater than about 2 and comprising: (i) from 25 to 75% by weight, based on 100% by weight of (i) and (ii), of one or more polyether monols having a hydroxyl number of less than 56, and containing less than 20% by weight of copolymerized oxyethylene, based on 100% by weight of (a)(i), and (ii) from 25 to 75% by weight, based on 100% by weight of (i) and (ii), of one or more polyether polyols having a hydroxyl number of about 47 to about 300, an average functionality of greater than 2 to about 6, and containing from about 5 to about 45% by weight of copolymerized oxyethylene, based on 100% by weight of (a)(ii); and (b) from 2 to 80% by weight, based on 100% by weight of component (a) and component (b), of one or more polyether polyols having a functionality of 2 to 8, a hydroxyl number of 20 to 240 and comprising at least 50% of copolymerized oxyethylene, based on 100% by weight of component (b).

In certain embodiments, the invention is directed to the polyol composition of the previous paragraph which additionally comprises at least one of: (c) one or more polyether polyols, which are different from (a)(ii), having a functionality of from about 2 to about 8, a hydroxyl number of from about 10 to about 300, and comprising from 0 to about 45% by weight of copolymerized oxyethylene, based on 100% by weight of component (c); and (d) one or more filled polyols.

In certain embodiments, the invention is directed to the polyol composition of the previous two paragraphs, wherein (a)(ii) comprises at least one polyether diol and at least one polyether triol.

In certain embodiments, the invention is directed to the polyol composition of the previous three paragraphs wherein (a)(i) said one or more polyether monols have a hydroxyl number of less than 28; (a)(ii) said one or more polyether polyols have a hydroxyl number of about 70 to about 240, and a functionality of about 2.5 to about 3.5; and (b) said one or more polyether polyols have a hydroxyl number of at least about 30 to about 170 mg KOH/g and a functionality of from at least about 2.5 to about 6 or less.

In certain embodiments, the invention is directed to the polyol composition of the previous four paragraphs wherein (c) said one or more polyether polyols have a hydroxyl number of at least about 20 to about 150 mg KOH/g and a functionality of from at least about 2.5 to about 6; and (d) said filled polyol comprises a polymer polyol selected from the group consisting of (i) polymer polyols containing styrene-acrylonitrile solids, (ii) polyisocyanate polyaddition polyols, (iii) polyhydrazodicarbonamide polyols and (iv) mixtures thereof.

In certain embodiments, the present invention is directed to a process of preparing the polyol composition the previous five paragraphs comprising: (I) the in-situ production of a polyol blend, comprising: A) introducing into a reaction vessel a mixture comprising: (1) an initial starter ($S_i$) comprising one or more monofunctional compounds having a hydroxyl number of less than about 56 and containing less than 20% by weight of copolymerized oxyethylene, based on 100% by weight of said monofunctional compounds, and (2) a DMC (double metal cyanide) catalyst; B) feeding (1) an epoxide comprising propylene oxide and ethylene oxide in a weight ratio of from 100:0 to 20:80, into the reaction vessel; C) allowing said epoxide mixture and said initial starter ($S_i$) to react and continuing to polymerize by feeding the epoxide until the equivalent weight of the monofunctional compound is increased by at least 10% by weight and reaches a value between about 1,500 and about 6,000; D) continuously adding (1) one or more low molecular weight starters ($S_c$) having an average functionality of greater than 2 to about 6 and an equivalent weight of about 28 to about 400 into the reaction vessel while continuing to feed epoxide; E) completing addition of the continuous starter ($S_c$); and F) allowing the mixture to continue to polymerize in the reaction vessel until the resultant polyol composition has an overall hydroxyl number of from about 56 to about 250, an average functionality of greater than 2, and comprises (1) from about 25 to 75% by weight, based on 100% by weight of F)(1) and F)(2), of one or more polyether monols having an average hydroxyl number of less than 56, and containing less than 20% by weight of copolymerized oxyethylene, based on 100% by weight of (F)(1), and (2) from about 25 to 75% by weight, based on 100% by weight of F)(1) and F)(2), of one or more polyether polyols having a hydroxyl number of about 47 to about 300, an average functionality of greater than 2 to about 6, and containing from about 5 to about 45% by weight of copolymerized oxyethylene, based on 100% by weight of (F)(2); and (II) mixing the resultant in-situ produced polyol blend, with A) a polyether polyol having a functionality of 2 to 8, a hydroxyl number of 20 to 240 and comprising at least 50% of copolymerized oxyethylene, based on 100% by weight of the polyether polyol A).

In certain embodiments, the present invention is directed to the process of the previous paragraph wherein the resultant in-situ produced polyol blend from (I) is additionally mixed with at least one of: B) one or more polyether polyols having an OH number of from about 10 to about 300, a functionality of from about 2 to about 8, and which contain from 0 to 45% by weight of copolymerized oxyethylene, based on 100% by weight of component B); and/or C) one or more filled polyols.

In certain embodiments, the present invention is directed to the process of the previous two paragraphs wherein A)(1) said initial starter (Si) is prepared from starter comprising one or more $C_{12}$, $C_{13}$, $C_{14}$ and/or $C_{15}$ long chain alcohols.

In certain embodiments, the present invention is directed to the process of the previous three paragraphs wherein D)(1) said low molecular weight starter ($S_c$) is glycerin, propylene glycol, ethylene glycol, sucrose, sorbitol, or mixtures thereof.

In certain embodiments, the present invention is directed to the process of the previous four paragraphs wherein the resultant polyol composition in F) has an overall hydroxyl number of from at least about 75 to about 150 or less, and a functionality of from at least about 2.1 to about 4 or less.

Certain embodiments of the present invention are therefore directed to a process of for the production of an open celled, flexible polyurethane foam comprising reacting an isocyanate-functional component with an isocyanate-reactive component in the presence of components comprising a blowing agent, a catalyst, and a surfactant, wherein the isocyanate-functional component and the isocyanate-reactive component are reacted at an isocyanate index of 85 to 120, and wherein the isocyanate-reactive component comprises a polyol composition comprising: (a) from 20 to 98% by weight, based on 100% by weight of components (a) and (b), of an in-situ formed polyol blend having a hydroxyl number of from about 56 to about 250, and an average functionality greater than 2, and comprising: (i) from 25 to 75% by weight, based on 100% by weight of (i) and (ii), of one or more polyether monols having an average hydroxyl number of less than 56, and containing less than 20% by weight of copolymerized oxyethylene, based on 100% by weight of (a)(i), and (ii) from 25 to 75% by weight, based on 100% by weight of (i) and (ii), of one or more polyether polyols having a hydroxyl number of about 47 to about 300, an average functionality of greater than 2 to about 6, and containing from about 5 to about 45% by weight of copolymerized oxyethylene, based on 100% by weight of (a)(ii); and (b) from 2 to 80% by weight, based on 100% by weight of components (a) and (b), of one or more polyether polyols having a functionality of 2 to 8, a hydroxyl number of 20 to 240 and comprising at least 50% of copolymerized oxyethylene, based on 100% by weight of component (b).

In certain embodiments, the invention is directed to the process of the previous paragraph wherein the isocyanate-reactive component additionally comprises at least one of: (c) one or more polyether polyols, which are different from (a)(ii), having a functionality of from about 2 to about 8, a hydroxyl number of from about 10 to about 300, and comprising from 0 to about 45% by weight of copolymerized oxyethylene, based on 100% by weight of component (c); and/or (d) one or more polymer polyols.

In certain embodiments, the invention is directed to the process of the previous two paragraphs wherein (a)(ii) comprises at least one polyether diol and at least one polyether triol.

In certain embodiments, the invention is directed to the process of the previous three paragraphs wherein (a)(i) said one or more polyether monols have a hydroxyl number of less than 28; (a)(ii) said one or more polyether polyols have a hydroxyl number of about 70 to about 240, and a functionality of about 2.5 to about 3.5; and (b) said one or more polyether polyols have a hydroxyl number of at least about 30 to about 170 mg KOH/g and a functionality of from at least about 2.5 to about 6 or less.

In certain embodiments, the invention is directed to the process of the previous four paragraphs wherein (c) said one or more polyether polyols have a hydroxyl number of at least about 20 to about 150 mg KOH/g and a functionality of from at least about 2.5 to about 6; and (d) said filled polyol comprises a polymer polyol selected from the group consisting of (i) polymer polyols containing styrene-acrylonitrile solids, (ii) polyisocyanate polyaddition polyols, (iii) polyhydrazodicarbonamide polyols and (iv) mixtures thereof.

In certain embodiments, the invention is directed to the process of the previous five paragraphs wherein the catalyst comprises a non-fugitive amine catalyst.

In certain embodiments, the invention is directed to the process of the previous six paragraphs wherein the blowing agent comprises water.

In certain embodiments, the invention is directed to the process of the previous seven paragraphs wherein the reaction between said isocyanate-functional component and said isocyanate-reactive component occurs in the presence of one or more crosslinkers and/or foam stabilizers.

In certain embodiments, the invention is directed to the process of the previous eight paragraphs wherein the resultant open celled, flexible polyurethane foam has an air flow of greater than 3 scfm (or greater than 0.085 m$^3$/min) and a recovery time of less than 15 seconds.

Certain embodiments of the invention are also directed to an open celled, flexible polyurethane foam comprising the reaction product of an isocyanate-functional component with an isocyanate-reactive component in the presence of components comprising a blowing agent, a catalyst, and a surfactant, wherein the isocyanate-functional component and the isocyanate-reactive component are reacted at an isocyanate index of 85 to 120, and wherein the isocyanate-reactive component comprises a polyol composition comprising: (a) from 20 to 98% by weight, based on 100% by weight of components (a) and (b), of an in-situ formed polyol blend having a hydroxyl number of from about 56 to about 250, a functionality of greater than 2, and comprising: (i) from 25 to 75% by weight, based on 100% by weight of (i) and (ii), of one or more polyether monols having an average hydroxyl number of less than 56, and containing less than 20% by weight of copolymerized oxyethylene, based on 100% by weight of (a)(i), and (ii) from 25 to 75% by weight, based on 100% by weight of (i) and (ii), of one or more polyether polyols having a hydroxyl number of about 47 to about 300, an average functionality of greater than 2 to about 6, and containing from about 5 to about 45% by weight of copolymerized oxyethylene, based on 100% by weight of (a)(ii); and (b) from 2 to 80% by weight, based on 100% by weight of components (a) and (b), of one or more polyether polyols having a functionality of 2 to 8, a hydroxyl number of 20 to 240 and comprising at least 50% of copolymerized oxyethylene, based on 100% by weight of component (b).

In certain embodiments, the invention is directed to the open celled foam of the previous paragraph wherein the isocyanate-reactive component additionally comprises at least one of: (c) one or more polyether polyols, which are different from (a)(ii), having a functionality of from about 2 to about 8, a hydroxyl number of from about 10 to about 300, and comprising from 0 to about 45% by weight of copolymerized oxyethylene, based on 100% by weight of component (c); and/or (d) one or more polymer polyols.

In certain embodiments, the invention is directed to the open celled foam of the previous two paragraphs wherein (a)(ii) comprises at least one polyether diol and at least one polyether triol.

In certain embodiments, the invention is directed to the open celled foam of the previous three paragraphs wherein (a)(i) said one or more polyether monols have a hydroxyl number of less than 28; (a)(ii) said one or more polyether polyols have a hydroxyl number of about 70 to about 240, and a functionality of about 2.5 to about 3.5; and (b) said one or more polyether polyols have a hydroxyl number of at least about 30 to about 170 mg KOH/g and a functionality of from at least about 2.5 to about 6 or less.

In certain embodiments, the invention is directed to the open celled foam of the previous four paragraphs wherein (c) said one or more polyether polyols have a hydroxyl number of at least about 20 to about 150 mg KOH/g and a functionality of from at least about 2.5 to about 6; and (d) said filled polyol comprises a polymer polyol selected from the group consisting of (i) polymer polyols containing styrene-acrylonitrile solids, (ii) polyisocyanate polyaddition polyols, (iii) polyhydrazodicarbonamide polyols and (iv) mixtures thereof.

In certain embodiments, the invention is directed to the open celled foam of the previous five paragraphs wherein the catalyst comprises a non-fugitive amine catalyst.

In certain embodiments, the invention is directed to the open celled foam of the previous six paragraphs wherein the blowing agent comprises water.

In certain embodiments, the invention is directed to the open celled foam of the previous seven paragraphs wherein the reaction between said isocyanate-functional component and said isocyanate-reactive component occurs in the presence of one or more crosslinkers and/or stabilizers.

In certain embodiments, the invention is directed to the open celled foam of the previous eight paragraphs wherein the resultant open celled, flexible polyurethane foam has an air flow of greater than 3 scfm (or greater than 0.085 m$^3$/min) and a recovery time of less than 15 seconds.

Certain embodiments of the invention are therefore directed to an article comprising the foam of any of the previous nine paragraphs wherein the article comprises a body support.

In certain embodiments, the invention is directed to the article of the previous paragraph, wherein the body support comprises a pillow or a mattress topper.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

Examples

The following materials were used in the working examples:

Isocyanate A: toluene diisocyanate having 80% of 2,4-isomer and 20% of 2,6-isomer Isocyanate B: A polymethylene polyphenylisocyanate having an NCO group content of about 32-33% by weight, a functionality of about 2.3 and containing about 22% polymeric and 78% by weight of monomeric diphenylmethane diisocyanate having a 4,4'-isomer content of about 83%%, a 2,2'-isomer content of less than 1% and a 2,4'-isomer content of about 12%

Polyol A: An in-situ prepared multifunctional polyol prepared by alkoxylating a monol, diol, and triol with a DMC catalyst following the procedure described in U.S. Pat. No. 6,491,846. The starter comprises a 1600 MW (35 OH#) monol made from the propoxylation of Neodol 25 and is alkoxylated with a mixture of propylene oxide and ethylene oxide in a weight ratio of 82/18 to a hydroxyl number of about 17.8. At this point, a mixture of glycerin and propylene glycol in a 62.3 to 37.7 wt % ratio is continuously added along with mixture of propylene oxide and ethylene oxide in a weight ratio of 82/18 until a hydroxyl number of about 150 is reached. At this point, the propylene glycol and glycerin feeds are stopped and propylene oxide and ethylene oxide are continuously added in a weight ratio of 55/45 until a hydroxyl number of 120 is reached. The product had an overall functionality of about 2.4 and an overall hydroxyl number of about 120.

Polyol B: A polymer polyol containing about 44% solids, and prepared by in-situ polymerization of styrene and acrylonitrile in a glycerin started poly(oxypropyleneoxyethylene) polyol having a hydroxyl number of about 52, and containing about 13% of oxyethylene Polyol C: A glycerin started poly(oxypropyleneoxyethylene) polyol having a hydroxyl number of about 37, and containing about 73% of copolymerized oxyethylene Polyol D: A glycerin started poly(oxypropyleneoxyethylene) polyol having a hydroxyl number of about 28, and containing about 13% of oxyethylene as a cap to yield a primary hydroxyl end group content of about 80% by weight Polyol E: A polymer polyol containing about 10% by weight solids, and prepared by in-situ polymerization of styrene and acrylonitrile in a high molecular weight reactive polyol, with the polymer polyol having an overall hydroxyl number of about 30 mg KOH/g Polyol F: A glycerin started poly(oxypropyleneoxyethylene) polyol having a hydroxyl number of about 56, and containing about 7% of copolymerized oxyethylene Surfactant A: A silicone surfactant commercially available from Momentive Performance Materials as Niax L-618

Foam Modifier A: A foam modifier having a hydroxyl number of about 1240, commercially available from Momentive Performance Materials as Arcol DP-1022

Foam Modifier B: A delayed action crosslinking agent available from Evonik Industries as Ortegol 204

Catalyst A: An amine catalyst, commercially available from Momentive Performance Materials as NIAX A-1

Catalyst B: An amine catalyst, commercially available from Momentive Performance Materials as NIAX A-33

Catalyst C: A tin, commercially available from Air Products, now Versum, as Dabco T-9

Catalyst D: A non emissive amine catalyst, commercially available from Air Products, now Versum, as Dabco NE 500

The discontinuous free-rise box machine foams were prepared using the following procedure. This procedure was used to prepare the foams of Examples 3, 6-8 and 10-15. The polyols, water, silicone surfactants, amine catalysts, tin catalyst and any other non-isocyanate additives were added to a cylindrical container fitted with baffles. The contents were mixed at 2400 rpm for 60 seconds with an agitator having two turbine impellers. The mixture was then degassed for 15 seconds. Tin Catalyst C, if employed, was added at this time. After degassing, the contents were mixed at 2400 rpm for 15 seconds, during which period the isocyanate was added when about 7 seconds of mixing time remained. The Cannon-Viking box foam machine was used for these foams. All raw materials were added through a metering device, to a mix chamber (with maximum capacity of 120 kg) before being poured into a large open mold (approximately 200 cm by 200 cm by 150 cm height) and allowed to cure at ambient temperature for a minimum of 1 day. Observations made during foaming and curing are set forth in the Tables. The buns were then trimmed to top, middle and bottom (15 inches by 15 inches by 4 inches) foam sections and were roller crushed 3 times to a minimum thickness of about 0.5 inches. These samples were then conditioned for at least 16 hours at standard temperature (i.e. about 23° C.) and humidity (i.e. about 50%) before being tested.

The free-rise continuous MiniMax machine foams were produced using an one-third scale Maxfoam machine with Novaflex $CO_2$ capabilities. This procedure was used to prepare the foams of Examples 1, 2, 4 and 9. The Maxfoam machine offers the ability to add four individual polyol streams, two individual isocyanate streams, and fourteen individual additive streams, and to control the temperature of each individual polyol and isocyanate stream. In addition, computer control of the Maxfoam machine allows systems and foam grades to be changed throughout foam pour. Foam blocks ranged in size up to about 122 cm×122 cm×3048 cm in length can be prepared. Each foam grade was typically cut in about 10 ft. bun sections. The buns were then trimmed to top, middle and bottom 15×15×4 inches foam sections and were roller crushed 3 times to a minimum thickness of about 0.5 inches. These samples were then conditioned according to ASTM D3574-11 standard.

TABLE 1A

TDI High Air Flow Formulations

| | | Example | | | | |
|---|---|---|---|---|---|---|
| Chemical | OH # | 1 pphp | 2 pphp | 3 pphp | 4 pphp | 5** pphp |
| Polyol A | 120 | 72.00 | 73.00 | 78.00 | 81.00 | 85.00 |
| Polyol B | 28 | 20.00 | 20.00 | 15.00 | 10.00 | 0 |
| Polyol C | 37 | 8.00 | 7.00 | 7.00 | 9.00 | 0 |
| Polyol F | 56 | 0 | 0 | 0 | 0 | 15.00 |
| Foam Modifier A | 1244 | 0 | 0.80 | 1.50 | 2.00 | 0 |
| Water (distilled) | 6228 | 2.00 | 1.60 | 1.10 | 0.90 | 0.88 |
| Surfactant A | | 1.25 | 1.00 | 0.80 | 0.60 | 0.50 |
| Foam Modifier B | 2417 | 0.80 | 0.60 | 0.60 | 0.60 | 0.50 |
| Catalyst A | 251 | 0.15 | 0.07 | 0.07 | 0.07 | 0.07 |
| Catalyst B | 560 | 0.32 | 0.32 | 0.58 | 0.60 | 0.70 |
| Catalyst C | | 0.05 | 0.03 | 0.025 | 0.03 | 0.03 |
| Isocyanate Side | F NCO* | | | | | |
| Isocyanate A | 48.3 | 38.11 | 33.51 | 31.86 | 31.05 | 25.58 |
| NCO Index | | 102.00 | 102.00 | 100.00 | 99.00 | 92.00 |

*F NCO represents the NCO group content of the isocyanate component
**Example 5 is comparative

TABLE 1B

TDI High Airflow Physical Properties

| | | Example 1 | Example 2 | Example 3 | Example 4 | Example 5 |
|---|---|---|---|---|---|---|
| Target Density | kg/m$^3$ | 40 | 48 | 64 | 80 | 80 |
| Actual Density | kg/m$^3$ | 38.12 | 48.03 | 61.83 | 81.93 | 82.76 |
| Airflow | m$^3$/min | 0.12 | 0.12 | 0.09 | 0.10 | 0.03 |
| IFD 25% | N/323 cm$^2$ | 40.43 | 36.89 | 45.28 | 49.21 | 64.79 |
| Hysteresis | % | 72.46 | 78.42 | 87.43 | 92.79 | 89.68 |
| S.F. 65%/25% | | 2.48 | 2.65 | 2.81 | 2.71 | 2.40 |
| Tensile Strength | Kpa | 76.60 | 83.20 | 127.47 | 94.46 | 41.68 |
| Elongation | % | 156 | 198 | 251 | 264 | 177 |
| Tear Strength | N/m | 231.13 | 241.23 | 269.07 | 238.72 | 96.66 |
| 50% Comp Set | % | 5.31 | 3.07 | 3.42 | 1.89 | 1.90 |
| 90% Comp Set | % | 6.47 | 3.11 | 4.00 | 3.97 | 2.60 |
| Resilience | % | 17 | 12 | 7 | 0 | 5 |
| Recovery | seconds | 9 | 7 | 5 | 3 | 13 |

TABLE 2A

MDI High Airflow Formulations

| Chemical | OH # | Example 6 pphp | Example 7 pphp | Example 8 pphp | Example 9 pphp |
|---|---|---|---|---|---|
| Polyol A | 120 | 55 | 55 | 55 | 55 |
| Polyol C | 37 | 35 | 35 | 35 | 35 |
| Polyol D | 28 | 10 | 10 | 10 | 10 |
| Foam Modifier A | 1244 | | | 1.50 | 1.50 |
| Water (distilled) | 6228 | 2.25 | 2.10 | 1.55 | 1.10 |
| Surfactant A | | 0.80 | 0.80 | 0.50 | 0.50 |
| Catalyst A | 251 | 0.15 | 0.15 | 0.17 | 0.20 |
| Catalyst B | 560 | 0.15 | 0.20 | 0.17 | 0.17 |
| Catalyst C | | 0.03 | 0.03 | 0.03 | 0.03 |
| Isocyanate Side | | | | | |
| Isocyanate B | FNCO* | 48.52 | 46.55 | 43.14 | 37.80 |
| NCO Index | | 95.00 | 95.00 | 95.00 | 95.00 |

TABLE 2B

MDI High Airflow Physical Properties

| | | Example 6 | Example 7 | Example 8 | Example 9 |
|---|---|---|---|---|---|
| Target Density | kg/m$^3$ | 40 | 48 | 64 | 80 |
| Actual Density | kg/m$^3$ | 39.43 | 49.82 | 63.03 | 80.06 |
| Airflow | m$^3$/min | 0.19 | 0.15 | 0.14 | 0.15 |
| IFD 25% | N/323 cm$^2$ | 30.11 | 29.48 | 34.83 | 48.50 |
| Hysteresis | % | 81.35 | 88.24 | 88.51 | 93.52 |
| S.F. 65%/25% | | 2.49 | 2.77 | 2.71 | 2.94 |
| Tensile Strength | Kpa | 37.54 | 43.44 | 45.51 | 73.31 |
| Elongation | % | 147 | 176 | 206 | 241 |
| Tear Strength | N/m | 175.86 | 185.84 | 202.59 | 248.06 |
| 50% Comp Set | % | 2.33 | 0.58 | 0.70 | 0.18 |
| 90% Comp Set | % | 6.32 | 2.07 | 3.77 | 0.78 |
| Resilience | % | 14 | 9 | 12 | 15 |
| Recovery | seconds | 3 | 3 | 3 | 3 |

TABLE 3A

TDI High Airflow Formulations

| Chemical | OH # | Example 10 pphp | Example 11 pphp | Example 12 pphp | Example 13 pphp |
|---|---|---|---|---|---|
| Polyol A | 120 | 78.00 | 78.00 | 81.00 | 81.00 |
| Polyol B | 28 | 15.00 | 15.00 | 10.00 | 10.00 |
| Polyol C | 37 | 7.00 | 7.00 | 9.00 | 9.00 |
| Foam Modifier A | 1244 | 1.25 | 1.25 | 2.00 | 2.00 |
| Water (distilled) | 6228 | 1.00 | 1.00 | 0.80 | 0.80 |
| Surfactant A | | 0.80 | 0.80 | 0.60 | 0.60 |
| Foam Modifier B | 2417 | 1.00 | 1.00 | 1.00 | 1.00 |
| Catalyst A | 251 | 0.07 | 0.07 | 0.07 | 0.07 |
| Catalyst B | 560 | 0.60 | | 0.70 | 0.175 |
| Catalyst C | | 0.025 | 0.025 | 0.030 | 0.030 |
| Catalyst D | 280 | | 0.60 | | 0.525 |
| Isocyanate Side | FNCO* | | | | |
| Isocyanate A | 48.3 | 32.88 | 32.61 | 32.30 | 32.07 |
| NCO Index | | 103.00 | 103.00 | 101.00 | 101.00 |
| % Solids | | 6.60 | 6.60 | 4.40 | 4.40 |
| Total Water | | 1.25 | 1.25 | 1.05 | 1.05 |

Figure 2:
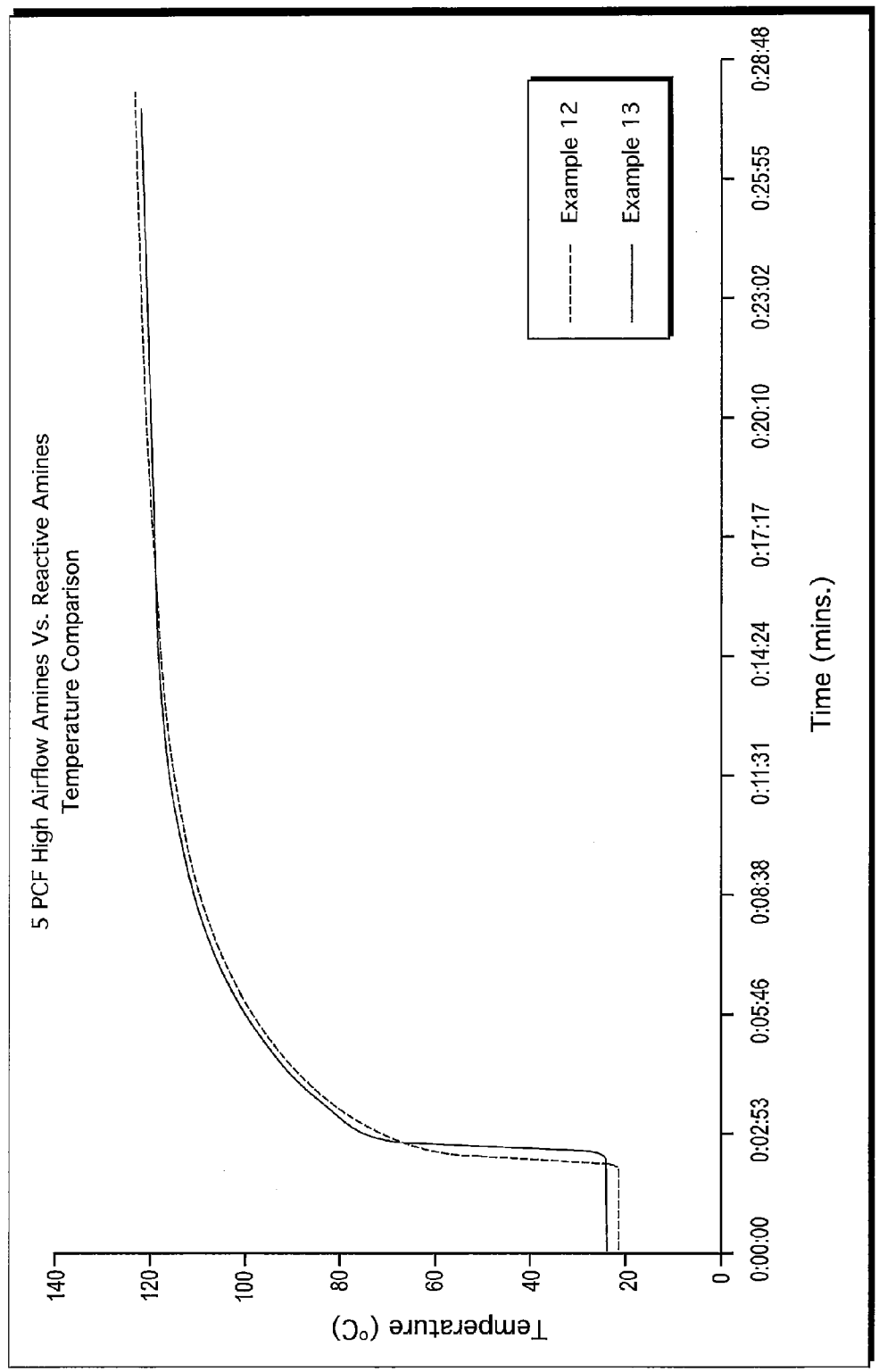
FIG. 2 is a graph showing the temperature comparison of two foams having a density of 5 pcf, in which one foam was prepared with conventional amine catalysts and one foam was prepared with partial replacement of the conventional amine catalyst by a non-fugitive amine catalysts.

FIG. 2 is a graph showing the temperature profiles of high air flow foams prepared with conventional amine catalysts vs. partial replacement of the conventional amine catalysts with a non-fugitive amine catalyst. More specifically, FIG. 2 illustrates the exotherm temperature profile of the foam formulations set forth in Examples 12 and 13 (see Table 3A) which were both prepared with a Box Foam Machine. The foam of Example 12 was prepared using conventional amine catalysts, and the foam formulation of Example 13 was similar to that of Example 12 but modified by partial replacement of the conventional amine with a non-fugitive amine to match the reactivity profile of the foam formulation in Example 12.

Figure 3:
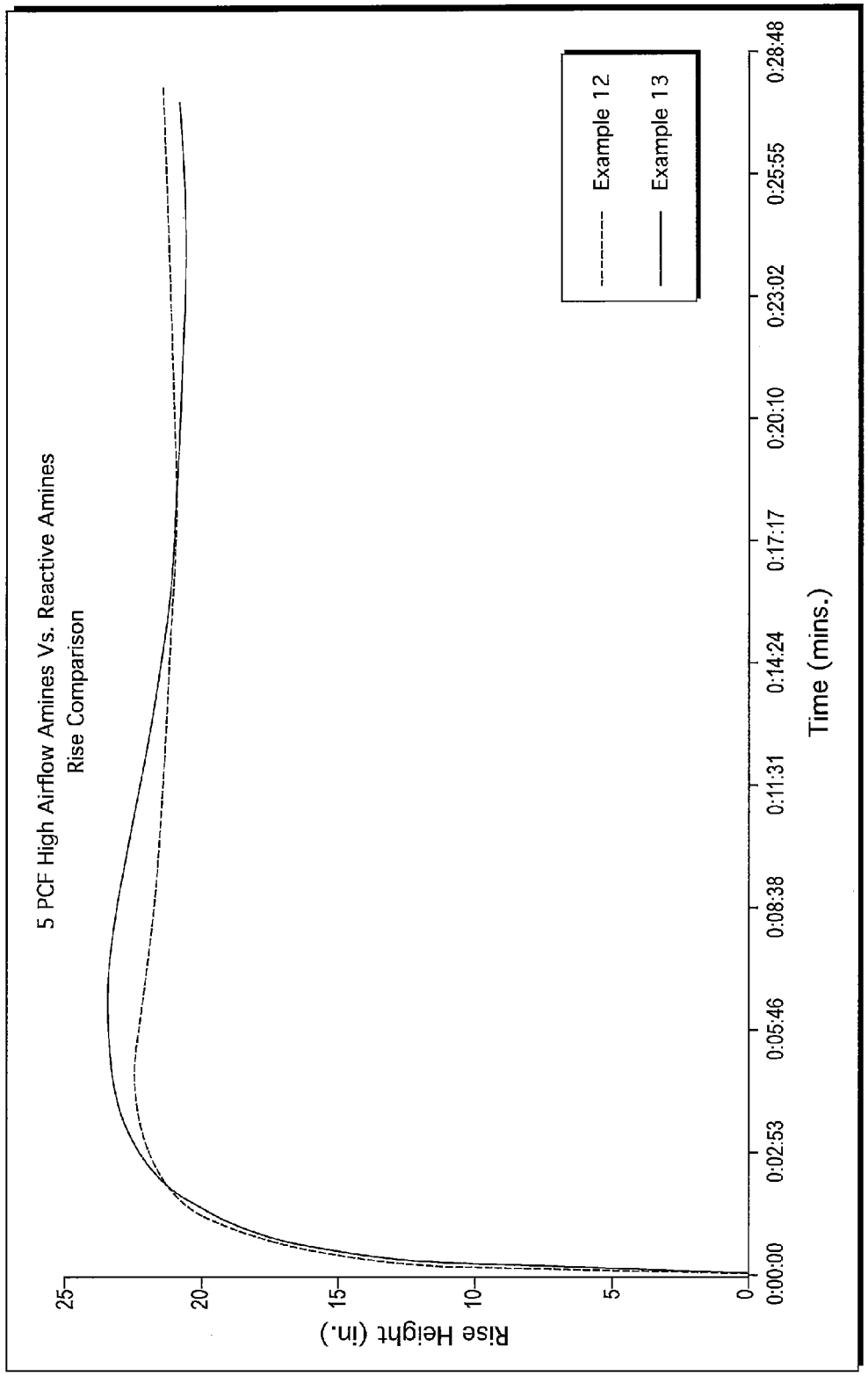
FIG. 3 is a graph showing the rise comparison of two foams having a density of 5 pcf in which one foam was prepared with convention amine catalysts and one foam was prepared with partial replacement of the conventional amine catalyst by a non-fugitive amine catalyst.

FIG. 3 is a graph showing the rise profile of high air flow foams prepared with conventional amine catalysts vs. partial replacement of the conventional amine catalysts with a non-fugitive amine catalyst. More specifically, FIG. 3 illustrates the rise profile of the foam formulations set forth in Examples 12 and 13 (see Table 3A) which were both prepared with a Box Foam Machine. The foam of Example 12 was prepared using conventional amine catalysts, and the foam formulation of Example 13 was similar to that of Example 12 but modified by partial replacement of the conventional amine catalysts with a non-fugitive amine catalyst to match the reactivity profile of the foam formulation in Example 12.

TABLE 3B

VOC Data - Examples 10 and 11 - TDI

| Example | Total VOC (Ug/m³) |
|---|---|
| Example 10-64 kg/m³ TDI | 520 |
| Example 11-64 kg/m³ TDI | 180 |

TABLE 3C

VOC Data - Examples 12 and 13 - TDI

| Example | Total VOC (Ug/m³) |
|---|---|
| Example 12-80 kg/m³ TDI | 1320 |
| Example 13-80 kg/m³ TDI | 330 |

TABLE 4A

TDI High Air Flow Foams - Fast Recovery Formulations

| | | Example | |
|---|---|---|---|
| | OH# | 14 pphp | 15 pphp |
| Polyol A | 120.0 | 30.00 | 60.00 |
| Polyol E | 30.0 | 10.00 | 10.00 |
| Polyol C | 37.0 | 60.00 | 30.00 |
| Water (distilled) | 6228.0 | 4.30 | 4.30 |
| Surfactant A | 552.0 | 0.12 | 0.08 |
| Catalyst A | 251.0 | 0.04 | 0.06 |
| Catalyst C | 0.0 | 0.05 | 0.08 |
| A-Side | FNCO | | |
| Isocyanate A | 48.3 | 51.11 | 54.95 |
| Isocyanate Index | | 100.00 | 100.00 |

TABLE 4B

TDI High Air Flow Foams - Physical Properties

| | | Example | |
|---|---|---|---|
| Property | Units | 14 | 15 |
| Density | kg/m³ | 21.33 | 20.90 |
| Airflow | m³/min | 0.28 | 0.24 |
| IFD 25% | N/323 cm² | 71.70 | 77.60 |
| Hystersis | % | 68.24 | 65.78 |
| S.F. 65%/25% | | 2.23 | 2.38 |
| Tensile Strength | Kpa | 104.80 | 89.41 |
| Elongation | % | 310 | 193 |
| Tear Strength | N/m | 547.07 | 416.15 |
| 50% Compression Set | % | 5.82 | 6.28 |
| 90% Compression Set | % | 7.46 | 10.58 |
| Resilience | % | 39.73 | 37.33 |
| Visco Recovery | Seconds | <3 | <3 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process of preparing a polyol composition, comprising:
   (I) the in-situ production of a polyol blend, comprising:
   A) introducing into a reaction vessel a mixture comprising:
   (1) an initial starter ($S_i$) comprising one or more monofunctional compounds having a hydroxyl number of less than about 56 and containing less than 20% by weight of copolymerized oxyethylene, based on 100% by weight of said one or more monofunctional compounds, and
   (2) a DMC (double metal cyanide) catalyst,
   B) feeding
   (1) an epoxide component comprising propylene oxide and ethylene oxide in a weight ratio of from 100:0 to 20:80,
   into the reaction vessel;
   C) allowing said epoxide component and said initial starter ($S_i$) to react and continuing to polymerize by feeding the epoxide component until the equivalent weight of the one or more monofunctional compounds is increased by at least 10% by weight and reaches a value between about 1,500 and about 6,000;
   D) continuously adding
   (1) one or more low molecular weight starters ($S_c$) having an average functionality of greater than 2 to about 6 and an equivalent weight of about 28 to about 400
   into the reaction vessel while continuing to feed said epoxide component;
   E) completing addition of said one or more low molecular weight starters ($S_c$); and
   F) allowing the mixture to continue to polymerize in the reaction vessel until the resultant polyol composition has an overall hydroxyl number of from about 56 to about 250, an average functionality of greater than 2, and comprises
   (1) one or more polyether monols having an average hydroxyl number of less than 56, and containing less than 20% by weight of copolymerized oxyethylene, based on 100% by weight of F)(1), and
   (2) and F)(2), of one or more polyether polyols having a hydroxyl number of about 47 to about 300, an average functionality of greater than 2 to about 6, and containing from about 5 to about 45% by weight of copolymerized oxyethylene, based on 100% by weight of F)(2),
   thereby producing a resultant in situ produced polyol blend,
   and wherein F)(1) and F)(2) are each present in the resultant in situ produced polyol blend in an amount of from about 25 to 75% by weight, based on 100% by weight of F)(1) and F)(2);
   and
   (II) mixing the resultant in-situ produced polyol blend from F),
   with
   A) one or more polyether polyols having a functionality of 2 to 8, a hydroxyl number of 20 to 240 and comprising at least 50% of copolymerized oxyethylene, based on 100% by weight of the one or more polyether polyols A).

2. The process of claim 1 wherein the resultant in-situ produced polyol blend from F) is additionally mixed with at least one of:
   B) one or more polyether polyols having an OH number of from about 10 to about 300, a functionality of from about 2 to about 8, and which contain from 0 to 45% by weight of copolymerized ox ethylene, based on 00% by weight of component B);
and C) one or more filled polyols.

3. The process of claim 1, wherein said initial starter ($S_i$) is prepared from starter comprising one or more $C_{12}$, $C_{13}$, $C_{14}$ and/or $C_{15}$ long chain alcohols.

4. The process of claim 1, where said one or more low molecular weight starters ($S_c$) comprises glycerin, propylene glycol, ethylene glycol, sucrose, sorbitol, or mixtures thereof.

5. The process of claim 1, wherein the resultant in situ produced polyol blend in F) has an overall hydroxyl number of from at least about 75 to about 150 or less, and a functionality of from at least about 2.1 to about 4 or less.

* * * * *